(12) United States Patent
Hama et al.

(10) Patent No.: US 6,230,323 B1
(45) Date of Patent: May 8, 2001

(54) TELEVISION RECEIVER

(75) Inventors: Yoshinori Hama, Kyoto; Takashige Wakamatsu, Amagasaki; Takaya Nonomura, Higashiosaka; Masako Wakisaka; Tadashi Shiono, both of Osaka; Kiyoshi Awano, Hirakata, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/381,297

(22) PCT Filed: Mar. 25, 1998

(86) PCT No.: PCT/JP98/01298
§ 371 Date: Sep. 22, 1999
§ 102(e) Date: Sep. 22, 1999

(87) PCT Pub. No.: WO98/44725
PCT Pub. Date: Oct. 8, 1998

(30) Foreign Application Priority Data

| Mar. 28, 1997 | (JP) | 9-77966 |
| Mar. 28, 1997 | (JP) | 9-77967 |
| Mar. 28, 1997 | (JP) | 9-77968 |
| Mar. 28, 1997 | (JP) | 9-77969 |

(51) Int. Cl.[7] ............................. G06F 3/00; G06F 13/00
(52) U.S. Cl. ................... 725/47; 725/43; 725/39
(58) Field of Search ............................. 345/327, 977, 345/973, 974, 347, 348; 348/906, 554, 555, 569, 570, 731–734; 455/3.2; 725/47, 43, 39

(56) References Cited

U.S. PATENT DOCUMENTS

| 5,436,675 | * | 7/1995 | Hayashi et al. | 348/725 |
| 5,670,902 | * | 9/1997 | Nakagawa et al. | 327/99 |
| 5,895,451 | * | 4/1999 | Yamade et al. | 705/8 |
| 5,929,932 | * | 7/1999 | Otsuki et al. | 348/569 |
| 5,973,750 | * | 10/1999 | Ogawa et al. | 348/570 |
| 6,005,601 | * | 12/1999 | Ohkura et al. | 348/7 |
| 6,061,063 | * | 5/2000 | Wagner et al. | 345/341 |
| 6,075,575 | * | 6/2000 | Schein et al. | 348/734 |

FOREIGN PATENT DOCUMENTS

| 1049499 | * | 2/1989 | (JP) . |
| 64-49499 |  | 2/1989 | (JP) . |
| 7-184136 |  | 7/1995 | (JP) . |
| 7-284035 |  | 10/1995 | (JP) . |
| 9-55894 |  | 2/1997 | (JP) . |

* cited by examiner

Primary Examiner—Andrew Faile
Assistant Examiner—Ngol Vu
(74) Attorney, Agent, or Firm—Arent Fox Kintner Plotkin & Kahn, PLLC

(57) ABSTRACT

The present invention relates to a television receiver capable of receiving at least digital satellite broadcasting such as CS broadcasting. The television receiver according to the present invention comprises first means for displaying a plurality of program guides in a matrix shape on a display device utilizing one of the horizontal axis and the vertical axis as a channel number axis and utilizing the other axis as a time axis, and second means for displaying air times for the program guides displayed on the display device in the shape of a bar graph that is long along the time axis.

6 Claims, 25 Drawing Sheets

FIG. 16

| KEY NUMBER | CH NUMBER |
|---|---|
| BS 1 | 101 |
| BS 3 | 105 |
| BS 5 | 200 |
| BS 7 | 202 |
| BS 9 | 300 |
| BS 11 | 302 |
| BS 13 | 405 |
| BS 15 | 500 |

204

TELEVISION RECEIVER

<TECHNICAL FIELD>

The present invention relates to a television receiver, and a television receiver capable of receiving at least digital satellite broadcasting such as CS broadcasting.

<BACKGROUND ART>

In a system for a digital satellite broadcasting such as CS broadcasting, a lot of (for example, 70 or more) channels are prepared, and a lot of programs are provided. In this system, guide information relating to the program which is being currently broadcast and the programs which will be broadcast in the future, together with original program data, are transmitted at predetermined time intervals. A television receiver capable of receiving digital satellite broadcasting has the function of displaying a program guide screen (a program guide list) on the basis of the program guide information.

In such a television receiver, a program guide list which is a part of the entire program guide list corresponding to all received program guide information, for example, is displayed on the program guide screen. A plurality of program guides are displayed in a matrix shape utilizing the vertical axis as a time axis and utilizing the horizontal axis as a channel number axis, for example, on the program guide screen. Programs corresponding to three channels and corresponding to three hours are displayed on the program guide screen.

A cursor for designating the program and scrolling the program guides on the program guide screen is displayed on the program guide screen. The cursor is moved by operating cursor moving keys. The cursor is moved along the time axis every time the cursor moving key for upward or downward movement is operated. On the other hand, the cursor is moved along the channel number axis every time the cursor moving key for leftward or rightward movement is operated. When the cursor is moved to an end of the program guide list displayed on the program guide screen, the program guides are scrolled on the program guide screen. When the program to be selected is selected by the cursor in the program guide list displayed on the program guide screen, and a determination key is then pressed, the program to be selected is selected by the cursor.

An object of the present invention is to provide a television receiver making it easy for a user to perceive an air time for a program guide displayed on a display device.

An object of the present invention is to provide a television receiver making it easy for a user to perceive which of time periods in one day includes an air time for a program guide displayed on a display device.

An object of the present invention is to provide a television receiver making it easy for a user to perceive whether or not a program guide displayed on a display device can be scrolled along the time axis and forward and whether or not it can be scrolled along the time axis and backward.

An object of the present invention is to provide a television receiver making it easy for a user to set an air time range in which program guides are to be displayed.

Developed as a television receiver is one capable of receiving ground wave broadcast programs, BS broadcast programs and CS broadcast programs. An operation unit of a remote control transmitter or the like in the television receiver is generally provided with 12 keys for selecting the ground wave broadcast programs and eight keys for selecting the BS broadcast programs. Since the number of channels on which the CS broadcast programs are respectively broadcast is very large, however, there is provided no program selection key for each channel. Therefore, channel selection in the CS broadcast programs is made on the program guide screen or by a channel skip key. When the channel selection in the CS broadcast programs is made by the channel skip key, it takes long to select the desired channel.

An object of the present invention is to provide a television receiver capable of selecting, when a channel skip key is operated, a channel range comprising no-charge and contracted channels in CS broadcasting as a channel range to be skipped and capable of making channel selection in CS broadcast programs in a short time.

An object of the present invention is to provide, in a television receiver capable of receiving at least BS broadcast programs and CS broadcast programs, a television receiver capable of using a BS program selection key as a preset key of a channel number for CS broadcasting, and selecting, with respect to a group of channels in a particular range on which the CS broadcast programs are respectively broadcast, the channel in a short time.

<DISCLOSURE OF THE INVENTION>

A first television receiver according to the present invention is characterized by comprising first means for displaying a plurality of program guides in a matrix shape on a display device utilizing one of the horizontal axis and the vertical axis as a channel number axis and utilizing the other axis as a time axis, and second means for displaying air times for the program guides displayed on the display device in the shape of a bar graph that is long along the time axis.

It is preferable that 24 hours constituting one day is classified into a plurality of time periods, different colors are respectively assigned to the time periods obtained by the classification, and the second means comprises means for displaying each of parts, respectively representing the air times, of a time display portion in the shape of the bar graph in the color assigned to the time period to which the air time represented by the part of the time display portion belongs.

An example of the first means is one comprising means for displaying a part of a program guide list in a predetermined range as program guides on the display device, and means for scrolling the program guides along the channel number axis and along the time axis in the program guide list in the predetermined range on the basis of a given input signal.

An example of the second means is one comprising means for displaying, when the program guides before the time when display is started in the predetermined range which is displayed by the time display portion in the shape of the bar graph cannot be displayed by scrolling, the shape of an end, on the side of the time when display is started, of the time display portion as a first shape, means for displaying, when the program guides before the time when display is started in the predetermined range which is displayed by the time display portion in the shape of the bar graph can be displayed by scrolling, the shape of the end, on the side of the time when display is started, of the time display portion as a second shape different from the first shape, means for displaying, when the program guides after the time when display is terminated in the predetermined range which is displayed by the time display portion in the shape of the bar graph cannot be displayed by scrolling, the shape of an end, on the side of the time when display is terminated, of the time display portion as a third shape, and means for displaying, when the program guides after the time when display is terminated in the predetermined range which is displayed by the time display portion in the shape of the bar graph can be displayed by scrolling, the shape of the end, on the side of the time when display is terminated, of the time display portion as a fourth shape different from the third shape.

The first shape and the third shape are square, for example. The second shape is a triangle projecting outward at the end, on the side of the time when display is started, of the time display portion, for example. The fourth shape is a triangle projecting outward at the end, on the side of the time when display is terminated, of the time display portion, for example.

In the first television receiver according to the present invention, the air time for the program guide displayed on the display device is easily perceived by a user. According to the present invention, it is easy for the user to perceive which of the time periods in one day includes the air time for the program guide displayed on the display device. According to the present invention, it is easy for the user to perceive whether or not the program guide displayed on the display device can be scrolled along the time axis and forward and whether or not it can be scrolled along the time axis and backward.

A second television receiver according to the present invention is characterized by comprising display means for displaying a plurality of program guides in a matrix shape on a display device utilizing one of the horizontal axis and the vertical axis as a channel number axis and utilizing the other axis as a time axis, and setting means for causing a user to set an air time range in which the program guide are to be displayed on the display device, the setting means comprising means for displaying air times corresponding to hours which can be taken along the time axis in an analog manner on the display device, means for causing the user to change the air times displayed in an analog manner on the display device, and means for causing the user to set the air times displayed in an analog manner on the display device as the air time range in which the program guides are to be displayed.

An example of the display means is one comprising means for displaying a part of a program guide list in a predetermined range as the program guides on the display device, and means for scrolling the program guides along the channel number axis and along the time axis in the program guide list in the predetermined range on the basis of a given input signal.

The air time range set by the setting means comprises, for example, a clock image representing the start time of the air time range and an image for representing the air time range in relation to the clock image.

The air time range set by the setting means comprises, for example, a time series image representing the air times in the shape of a bar graph and an index image representing an arbitrary part of the air time range on the time series image.

In the second television receiver according to the present invention, the air time range in which the program guides are to be displayed is easy to set by the user.

A third television receiver according to the present invention is characterized by comprising a channel skip key for skipping a selected channel, and selected channel skip means for skipping the selected channel in a channel range comprising no-charge and contracted channels in CS broadcasting when the channel skip key is operated. In the third television receiver according to the present invention, when the channel skip key is operated, the channel range comprising the no-charge and contracted channels in CS broadcasting can be selected as a channel range to be skipped. Accordingly, channels on which CS broadcast programs are respectively broadcast can be selected in a short time.

In a television receiver capable of broadcasting at least BS broadcast programs and CS broadcast programs, a fourth television receiver according to the present invention is characterized by comprising preset setting means for causing a user to preset a channel number for CS broadcasting in a BS program selection key, and selection means for selecting, when the BS program selection key is operated by the user at the time of a CS broadcast program receiving mode, the CS broadcast program on the basis of the channel number for CS broadcasting which is preset in the operated BS program selection key.

In the fourth television receiver according to the present invention, in the television receiver capable of receiving at least the BS broadcast programs and the CS broadcast programs, it is possible to use the BS program selection key as a preset key of the channel number for CS broadcasting. As a result, it is possible to select, with respect to a group of channels in a particular range on which the CS broadcast programs are respectively broadcast, the channel in a short time.

<BRIEF DESCRIPTION OF THE DRAWINGS>

FIG. 16 is a schematic view showing a preset key table;

<BEST MODE FOR CARRYING OUT THE INVENTION>

Figure 1:
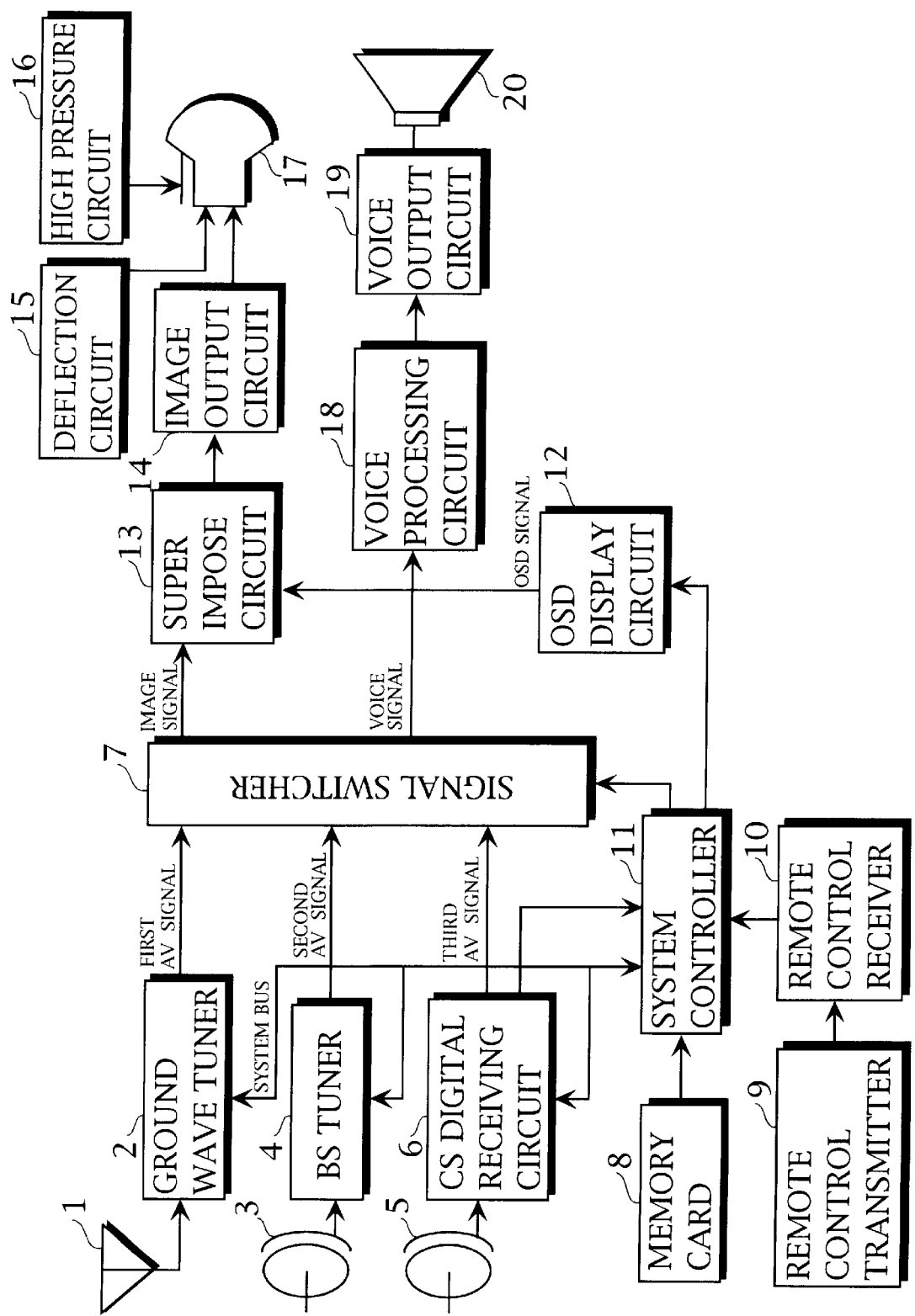
FIG. 1 is a block diagram showing the configuration of a television receiver.

Referring now to the drawings, description is made of an embodiment in a case where the present invention is applied to a television receiver capable of receiving ground wave broadcasting, BS broadcasting and CS broadcasting.

Programs provided by the CS broadcasting include free programs which can be viewed without charge if a fee for utilizing a system such as a fee for admission to a CS broadcasting system and a basic fee are paid and pay programs which are charged in addition to the fee for utilizing the system. Examples of the pay programs include one previously purchased for each channel and one charged only when it is viewed (PPV: pay per view). In order to view a PPV program, the procedure for purchase must be carried out on a television screen before the program is started or when the program is being broadcast.

[1] Description of Configuration of Television Receiver

FIG. 1 illustrates the configuration of a television receiver.

A ground broadcast wave is sent to a ground wave tuner 2 through a ground wave antenna 1. A first audio video signal (AV signal) obtained from the ground wave tuner 2 is sent to a signal switcher 7.

A BS broadcast wave utilizing a broadcasting satellite (BS) is sent to a BS tuner 4 through a BS antenna 3. A second audio video signal (AV signal) obtained from the BS tuner 4 is sent to the signal switcher 7.

A CS broadcast wave utilizing a communication satellite (CS) is sent to a CS digital receiving circuit 6 through a CS antenna 5. A third audio video signal (AV signal) obtained from the CS digital receiving circuit 6 is sent to the signal switcher 7. Additional information such as program guide information obtained from the CS digital receiving circuit 6 is sent to a system controller 11.

Information from a memory card 8 storing information such as information relating to a contract for CS broadcast programs is inputted to the system controller 11. Further, a remote control signal from a remote control transmitter 9 is inputted to the system controller 11 through a remote control receiver 10.

The system controller 11 sends information such as information for channel selection to each of the tuners 2, 4, and 6, and sends a switching signal corresponding to a receiving mode to the signal switcher 7. Examples of the receiving mode include a ground wave broadcast program receiving mode, a BS broadcast program receiving mode, and a CS broadcast program receiving mode. The system controller 11 sends to an OSD display circuit 12 an OSD signal for on-screen displaying on a CRT 17 a program guide screen for CS broadcasting and various setting screens for CS broadcasting. The OSD display circuit 12 sends on-screen image information to a super impose circuit 13.

The signal switcher 7 selects one of the first, second and third AV signals on the basis of the switching signal sent from the system controller 11, and outputs an image signal and a voice signal which are included in the selected AV signal.

The image signal outputted from the signal switcher 7 is sent to the super impose circuit 13. The super impose circuit 13 produces such an image signal that an on-screen image is displayed on an image representing a selected program on the basis of the image signal outputted from the signal switcher 7 and the on-screen image information sent from the OSD display circuit 12. The image signal outputted from the super impose circuit 13 is sent to the CRT 17 comprising a deflection circuit 15 and a high pressure circuit 16 through an image output circuit 14.

The voice signal outputted from the signal switcher 7 is sent to a speaker 20 through a voice processing circuit 18 and a voice output circuit 19.

[1-1] Description of Configuration of CS Digital Receiving Circuit 6

Figure 2:
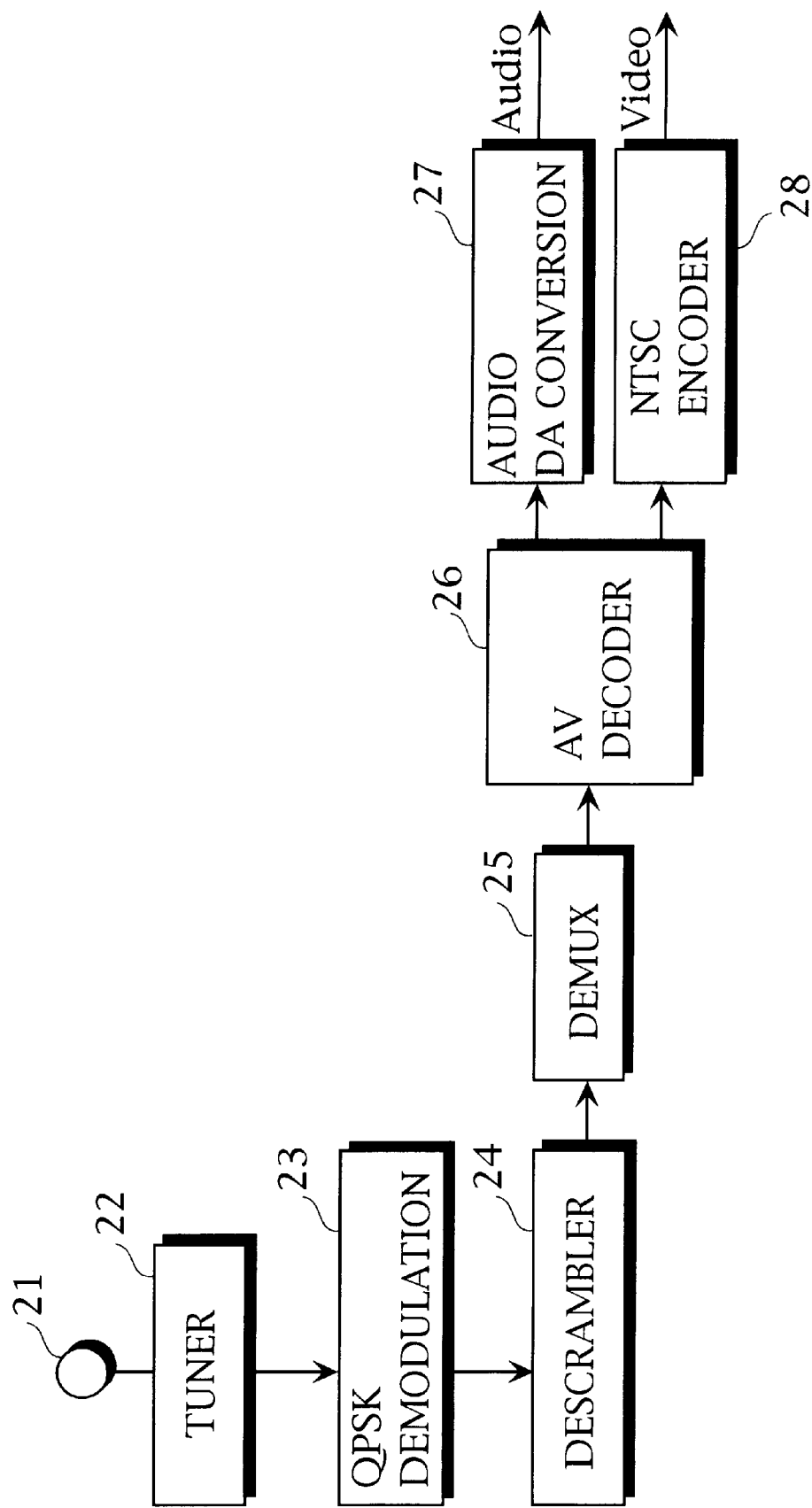
FIG. 2 is a block diagram showing the configuration of a CS digital receiving circuit 6 shown in FIG. 1.

FIG. 2 illustrates the configuration of the CS digital receiving circuit 6 shown in FIG. 1.

A high frequency signal from the CS antenna 5 is inputted to an input terminal 21. The signal inputted to the input terminal 21 is sent to a tuner 22, where high frequency processing is performed. An output of the tuner 22 is sent to a QPSK demodulation circuit 23, where QPSK demodulation is performed. An output of the QPSK demodulation circuit 23 is sent to a descrambler 24, where scrambling is released if required.

An output of the descrambler 24 is sent to a DEMUX 25, where a packet is demodulated. An output of the DEMUX 25 is sent to an AV decoder 26, where MPEG (Motion Picture Expert Group) decoding is performed. A voice signal outputted from the AV decoder 26 is sent to an audio DA conversion circuit 27, where the voice signal is converted into an analog voice signal. An image signal outputted from the AV decoder 26 is sent to an NTSC encoder 28, where the image signal is converted into an NTSC signal.

The DEMUX 25 extracts program guide information, time information representing the current time, and so forth from the input signal, and supplies the information to the system controller 11. The system controller 11 stores the program guide information and the time information which have been sent in a storage device (not shown) The storage device further stores menu screen information for displaying a menu screen, set screen information for displaying various types of set screens, and the other information.

[1-2] Description of Configuration of Remote Control Transmitter 9

Figure 3:
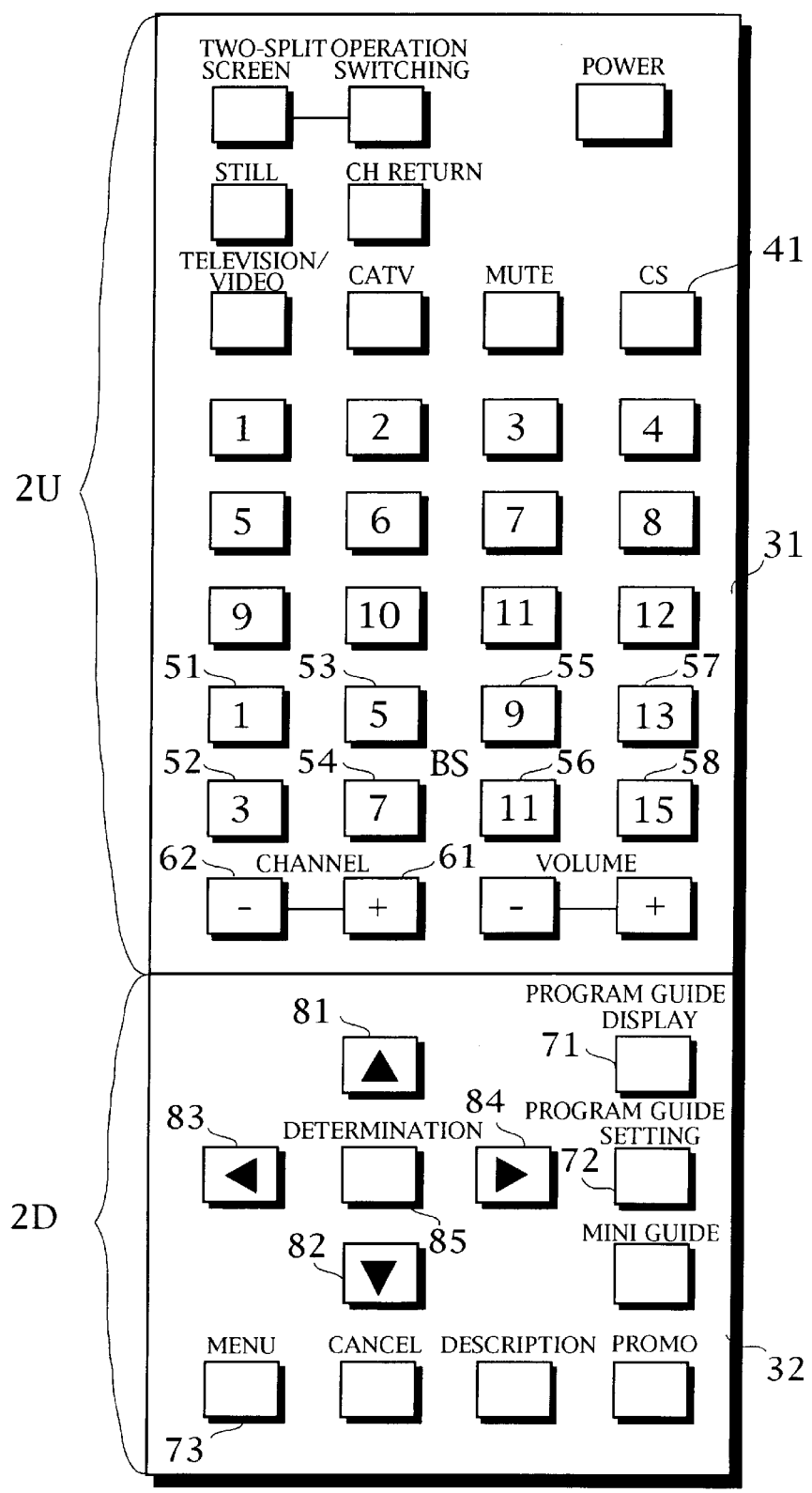
FIG. 3 is a plan view showing the appearance of a remote control transmitter.
Figure 4:
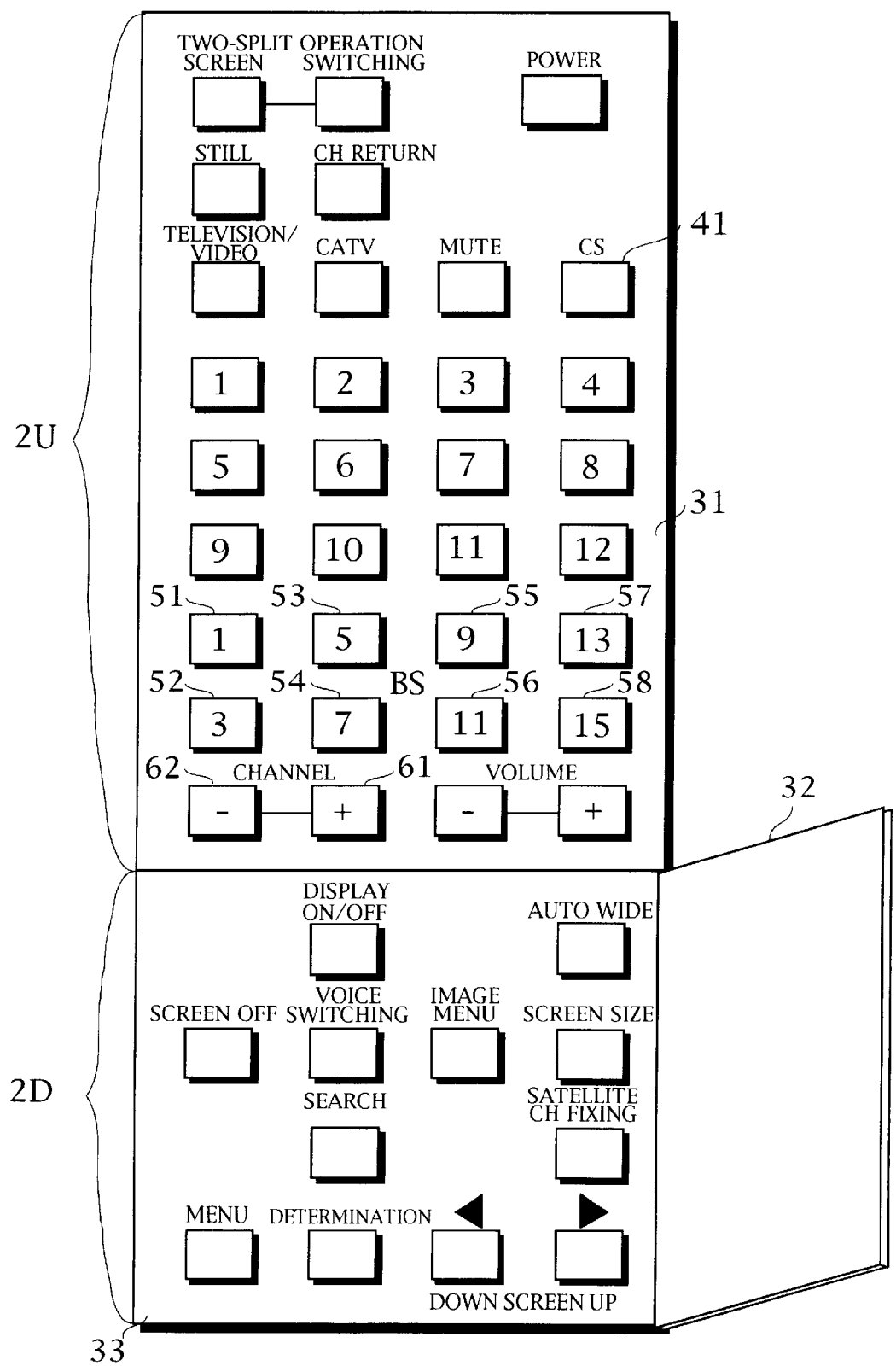
FIG. 4 is a plan view showing a state where an opening or closing cover of the remote control transmitter is opened.

FIGS. 3 and 4 illustrate the appearance of the remote control transmitter 9.

The remote control transmitter 9 comprises an upper side 2U constituting a first operation unit 31 and a lower side 2D constituting second and third operation units 32 and 33. An infrared transmission unit (not shown) for transmitting information to the remote control receiver 10 from the remote control transmitter 9 is provided on an end surface at an upper end of the upper side 2U. The lower side 2D comprises an opening or closing cover constituting the second operation unit 32. The third operation unit 33 is constructed below the opening or closing cover 32.

The first operation unit 31 is mainly provided with keys which are operated when a ground wave broadcast program or BS broadcast program is viewed. That is, the first operation unit 31 is provided with a power key, a two-split screen mode selection key, an operation switching key, a still key, a channel return key, a television/video switching key, a CATV key, a mute key, a CS key 41 which is operated in order to view a CS broadcast program, ground wave broadcast program selection keys for selecting a ground wave broadcast program which are respectively assigned to first to twelfth channels, BS broadcast program selection keys 51 to 58 for selecting a BS broadcast program (a CS broadcast program depending on cases) which are respectively assigned to odd channels from first to fifteenth channels, channel skip keys 61 and 62 for skipping the selected channel, and a volume adjustment key.

As described above, examples of the receiving mode include a ground wave broadcast program receiving mode, a BS broadcast program receiving mode, and a CS broadcast program receiving mode. In principle, the receiving mode is the ground wave broadcast program receiving mode when the ground wave broadcast program selection keys are operated, is the BS broadcast program receiving mode when the BS broadcast program selection keys 51 to 58 are operated, and is the CS broadcast program receiving mode when the CS key 41 is operated. In the present embodiment, however, the BS broadcast program selection keys 51 to 58 can be also used as CS broadcast program selection keys. Even if the BS broadcast program selection keys 51 to 58 are operated at the time of the CS broadcast program receiving mode, therefore, the receiving mode may not, in some cases, be changed into the BS broadcast program receiving mode.

The second operation unit 32 is provided with keys which are effective only when the receiving mode is the CS broadcast program receiving mode. That is, the second operation unit 32 is provided with a program guide display key 71 for displaying a program guide screen for CS broadcasting, a program guide setting key 72 for performing display setting on the program guide screen, a menu key 73 for displaying a main menu screen for performing various types of setting, cursor keys 81 to 84 for respectively moving a cursor upward and downward and rightward and leftward, a determination key 85, and so forth.

The third operation unit 33 is provided with various types of keys for performing basic setting of the television receiver.

[2] Description of Program Guide Screen for CS Broadcasting

Figure 5:
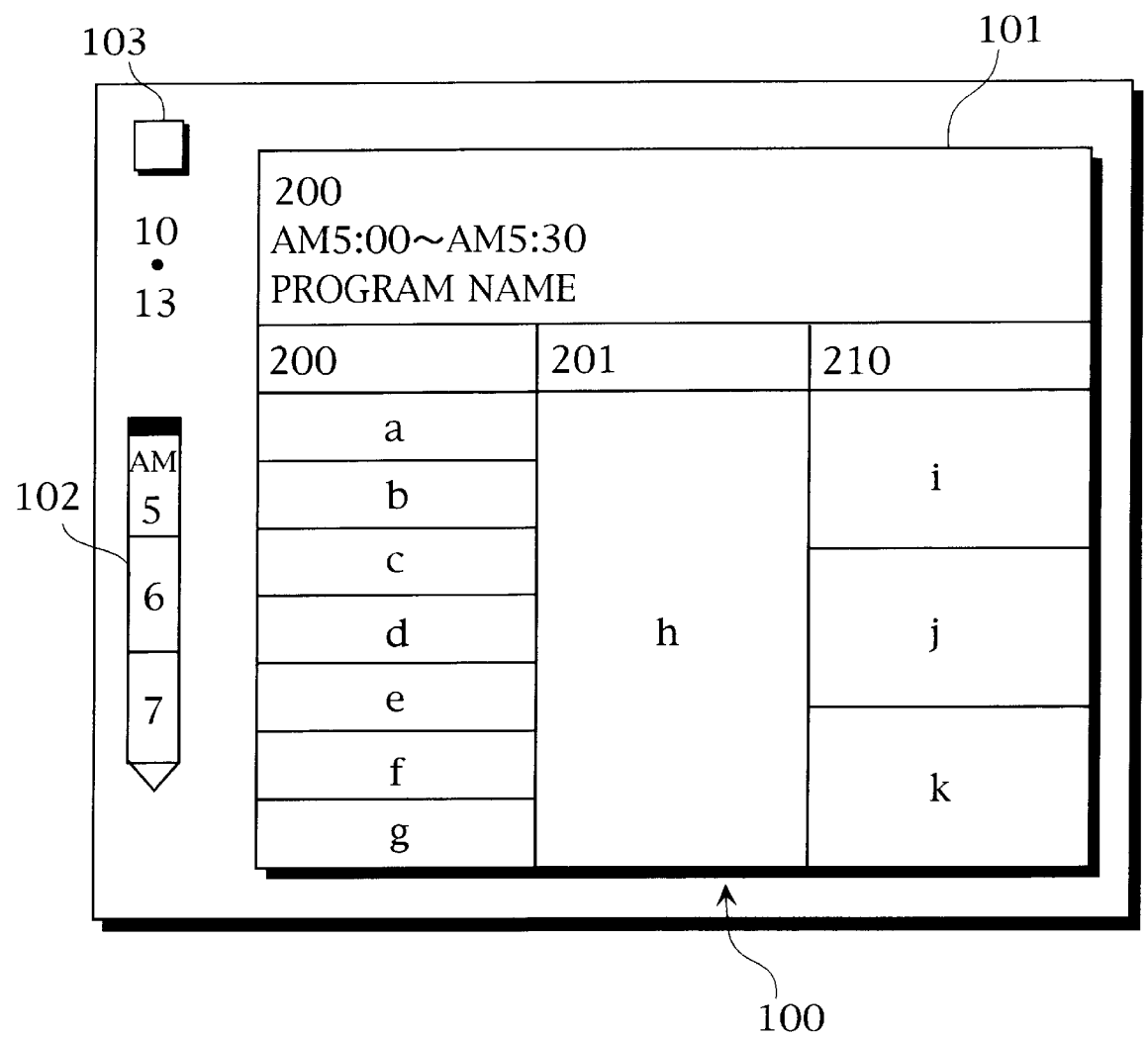
FIG. 5 is a schematic view showing an example of a program guide screen.

FIG. 5 illustrates an example of a program guide screen displayed on the CRT 17 in a case where the program guide display key 71 is operated. A program guide list 100 which is a part of the entire program guide list corresponding to all program guide information in a predetermined range is displayed on the program guide screen. A plurality of program guides are displayed in a matrix shape utilizing the vertical axis as a time axis and utilizing the horizontal axis as a channel number axis in the program guide list 100. In this example, programs corresponding to three hours on three channels are displayed in the program guide list 100.

A channel number is displayed in the upper row in each of columns in the program guide list 100. In the column corresponding to each of the channels, frames respectively representing air times for programs which are broadcast on the channel are displayed, and a title name (a to k) is displayed in each of the frames. Information relating to the program currently selected by the cursor, that is, a channel number of the program selected by the cursor, the air time for the program, and the name of the program are displayed on a display row 101 at the top of the program guide list 100.

A cursor for designating the program and scrolling the program guides on the program guide screen is displayed on a main menu screen. The cursor is moved by operating four cursor keys 81 to 84 respectively provided in four directions, i.e., upward, downward, leftward and rightward. In a case where the cursor is positioned in the program guide list 100, every time the cursor keys for upward or downward movement (cursor upward-and-downward moving keys) 81 and 82 are operated, the cursor is moved along the time axis. On the other hand, in a case where the cursor is positioned in the program guide list 100, every time cursor keys for rightward or leftward movement (cursor right-and-left moving keys) 83 and 84 are operated, the cursor is moved along the channel number axis.

A mark 103 representing a channel range which can be displayed in the program guide list 100, the date for broadcasting of the programs which are displayed in the program guide list 100, and the air times for the programs which are displayed in the program guide list 100 are displayed on the left side of the program guide list 100. The channel range which can be displayed in the program guide list 100 is set by channel setting, as described later. Although the mark 103 representing the channel range which can be displayed in the program guide list 100 actually changes depending on contents set by the channel selecting, the same mark will be illustrated on the following drawings.

The air times for the programs which are displayed in the program guide list 100 are displayed in the shape of a bar graph in a display frame 102 extending vertically. Time display portions in hour units respectively representing the air times for the programs which are displayed in the program guide list 100 are currently arranged in the longitudinal direction. In the present embodiment, 24 hours constituting one day are previously divided into a plurality of time periods, for example, morning, afternoon, and evening, and different colors are respectively assigned to the time periods. Each of the time display portions which are displayed in the display frame 102 is displayed in the color assigned to the time period in which the air time represented by the time display portion belongs.

Figure 6A:
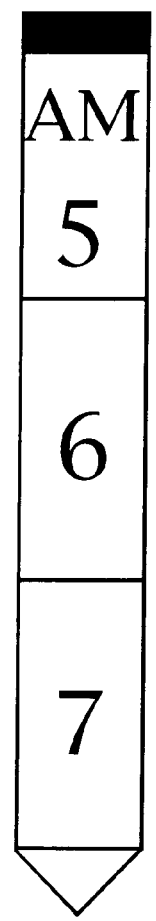
FIGS. 6a, 6b and 6c are schematic views showing that the shape of a time display frame changes.
Figure 6B:
Figure 6C:
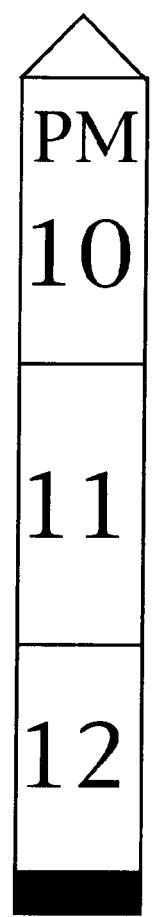

In the present embodiment, examples of the shape of an upper end of the display frame 102 include two types, i.e., a square (FIG. 6a) and an upward triangle (FIGS. 6b and 6c). Similarly, examples of the shape of a lower end of the display frame 102 include two types, i.e., a square (FIG. 6c) and a downward triangle (FIGS. 6a and 6b).

When the time when time display is started which is currently displayed in the display frame 102 is the current time, the preceding program guides are not displayed even by scrolling. Accordingly, the upper end of the display frame 102 is produced in the shape of the square, as shown in FIG. 6a, in order that the program guides before the time when time display is started are not also displayed by scrolling. When the time when time display is started which is currently displayed in the display frame 102 is not the current time, and the preceding program guides can be displayed by scrolling, the upper end of the display frame 102 is produced in the shape of the upward triangle, as shown in FIGS. 6b and 6c, in order that the program guides before the time when time display is started can be displayed by scrolling.

When the program guides after the time when time display is terminated which is currently displayed in the display screen 102 cannot be displayed even by scrolling, the lower end of the display frame 102 is produced in the shape of the square, as shown in FIG. 6c, in order that the program guides after the time when time display is terminated cannot be displayed. When the program guides after the time when time display is terminated which is currently displayed in the display frame 102 can be displayed by scrolling, the lower end of the display frame 102 is produced in the shape of the downward triangle, as shown in FIGS. 6a and 6b, in order that the program guides after the time when time display is terminated can be displayed.

[3] Description of Display Setting on Program Guide Screen for CS Broadcasting

In order to designate a range of program guides which are displayed in the program guide list 100, the following display setting can be performed.

(1) Display Channel Setting: Setting for restricting channels which are displayed in the program guide list 100

(2) Display Date Setting: Setting for designating a date which is displayed in the program guide list 100

(3) Display Time Setting: Setting for designating a time range which is displayed in the program guide list 100

By operating the program guide setting key 72, and then operating the cursor keys (cursor upward-and-downward moving keys) 81 and 82, a display channel setting screen, a display date setting screen, and a display time setting screen can be successively displayed on the CRT 17.

[3-1] Description of Display Channel Setting

Figure 7:
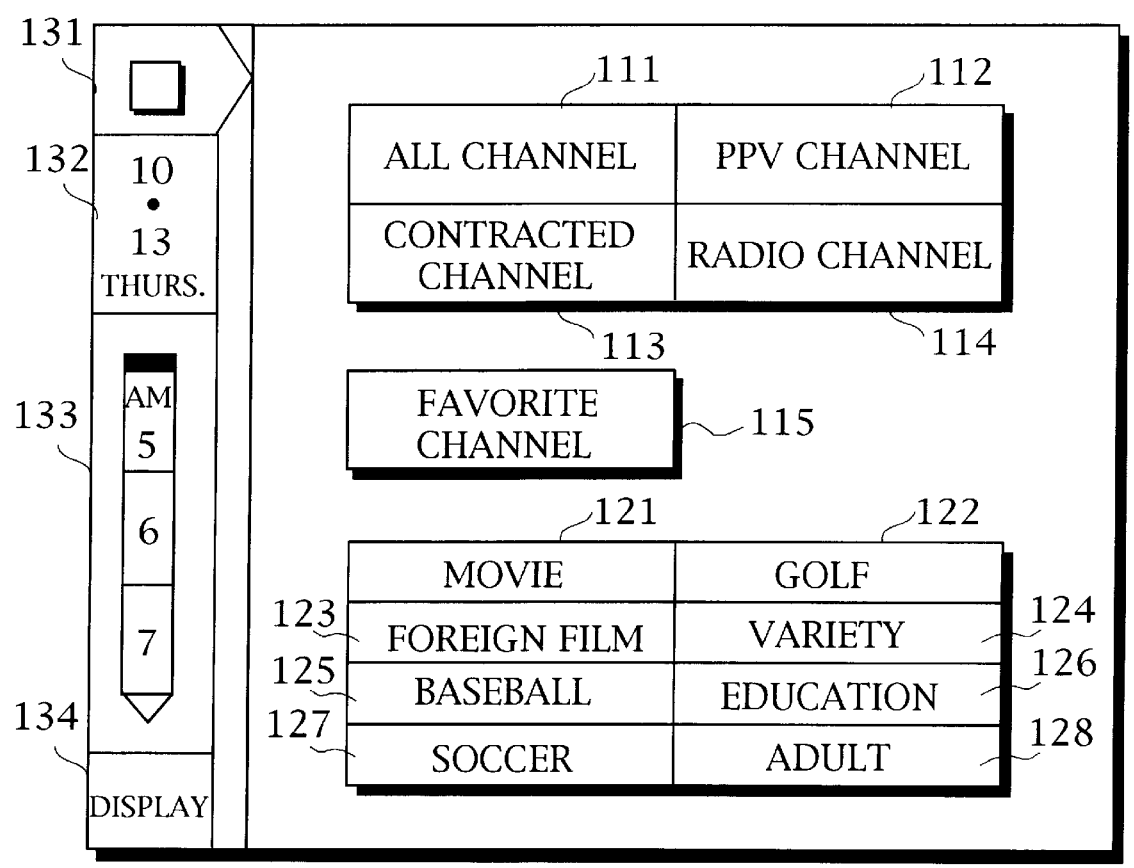
FIG. 7 is a schematic view showing a display channel setting screen.

FIG. 7 illustrates the display channel setting screen.

The display channel setting screen is provided with a button 111 for designating all channels as a channel range in which program guides can be displayed, a button 112 for designating a PPV channel as a channel range in which program guides can be displayed, a button 113 for designating a contracted channel as a channel range in which program guides can be displayed, a button 114 for designating a radio channel as a channel range in which program guides are displayed, a button 115 for designating a favorite channel as a channel range in which program guides can be displayed, and buttons 121 to 128 for designating channels respectively adapted to various types of categories as a channel range in which program guides can be displayed. The favorite channel is a channel set in favorite channel setting, described later, by a user.

If the user selects a desired one of the buttons using the cursor keys 81 to 84, and then presses the determination key 85, a channel corresponding to the selected button is set as a channel range in which program guides can be displayed.

A display channel setting button 131, a display date setting button 132, a display time setting button 133, and a program guide screen display button 134 are provided at the left of the display channel setting screen.

A mark representing a channel range, in which program guides can be displayed, currently set is displayed in the display channel setting button 131. Although the display channel setting button 131 is generally rectangular, it is displayed on the display channel setting screen upon being deformed such that its right end is triangular in order to clearly show that the current screen is the display channel setting screen.

A display date currently set is displayed in the display date setting button 132. If the display date setting button 132 is selected by the cursor keys 81 to 84, and the determination key 85 is then operated, the display screen is changed into the display date setting screen.

A display time currently set is displayed in the display time setting button 133. If the display time setting button 133 is selected by the cursor keys 81 to 84, and the determination key 85 is then operated, the display screen is changed into the display time setting screen.

If the program guide screen display button 134 is selected by the cursor keys 81 to 84, and the determination key 85 is then operated, the channel range, the display date and the display time which are currently set are displayed, and a program guide screen adapted to the channel range, the display date and the display time which are currently set is then displayed.

[3-2] Description of Display Date Setting

Figure 8:
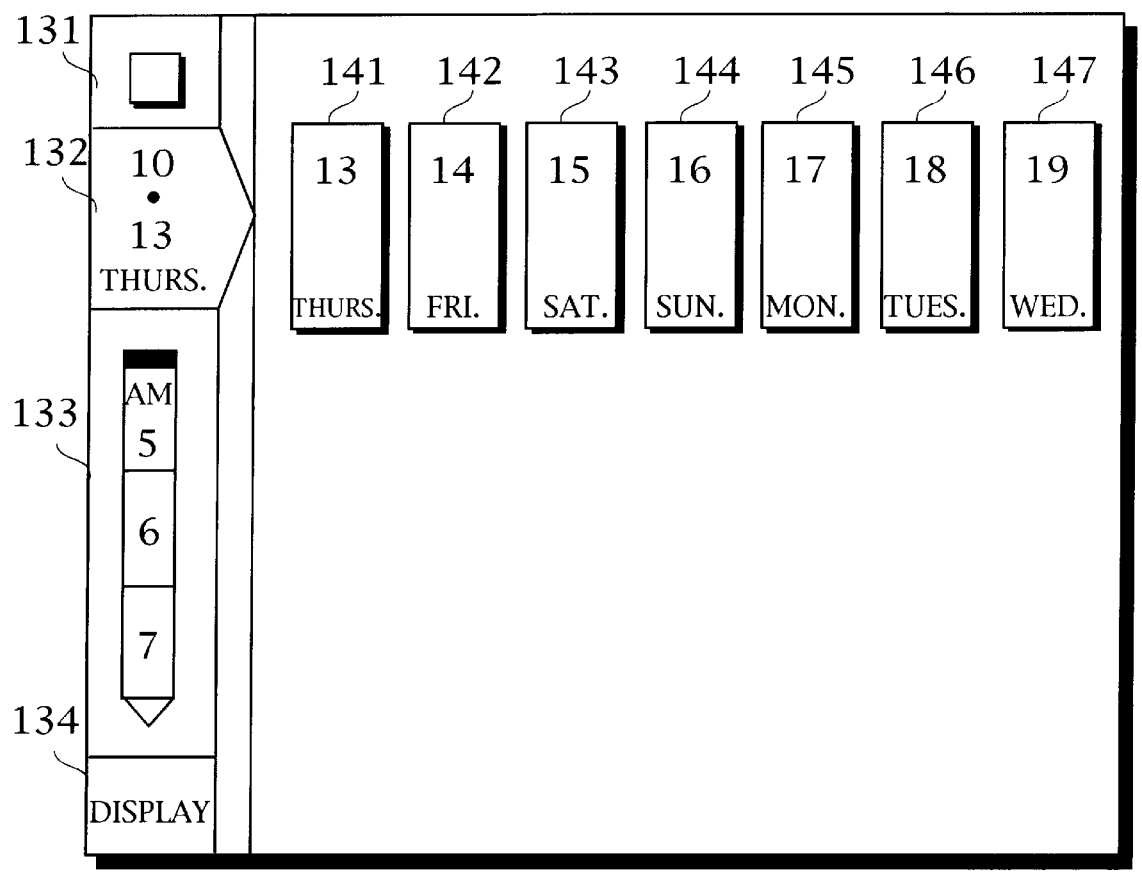
FIG. 8 is a schematic view showing a display date setting screen.

FIG. 8 illustrates the display date setting screen. Seven date buttons 141 to 147 representing respective days constituting one week from the current day are displayed on the display date setting screen. If the user selects a desired one of the buttons 141 to 147 using the cursor keys 81 to 84, and then presses the determination key 85, the day corresponding to the selected button is set as a display date.

A display channel setting button 131, a display date setting button 132, a display time setting button 133, and a program guide screen display button 134 are provided at the left of the display date setting screen. If the display channel setting button 131 is selected by the cursor keys 81 to 84, and the determination key 85 is then operated, the display screen is changed into the display channel setting screen. Although the display date setting button 132 is generally rectangular, it is displayed on the display date setting screen upon being deformed such that its right end is triangular in order to clearly show that the current screen is the display date setting screen.

If the display time setting button 133 is selected by the cursor keys 81 to 84, and the determination key 85 is then operated, the display screen is changed into the display time setting screen. If the program guide screen display button 134 is selected by the cursor keys 81 to 84, and the determination key 85 is then operated, the channel range, the display date and the display time which are currently set are displayed, and a program guide screen adapted to the channel range, the display date and the display time which are currently set is then displayed.

[3-3] Description of Display Time Setting

Figure 9:
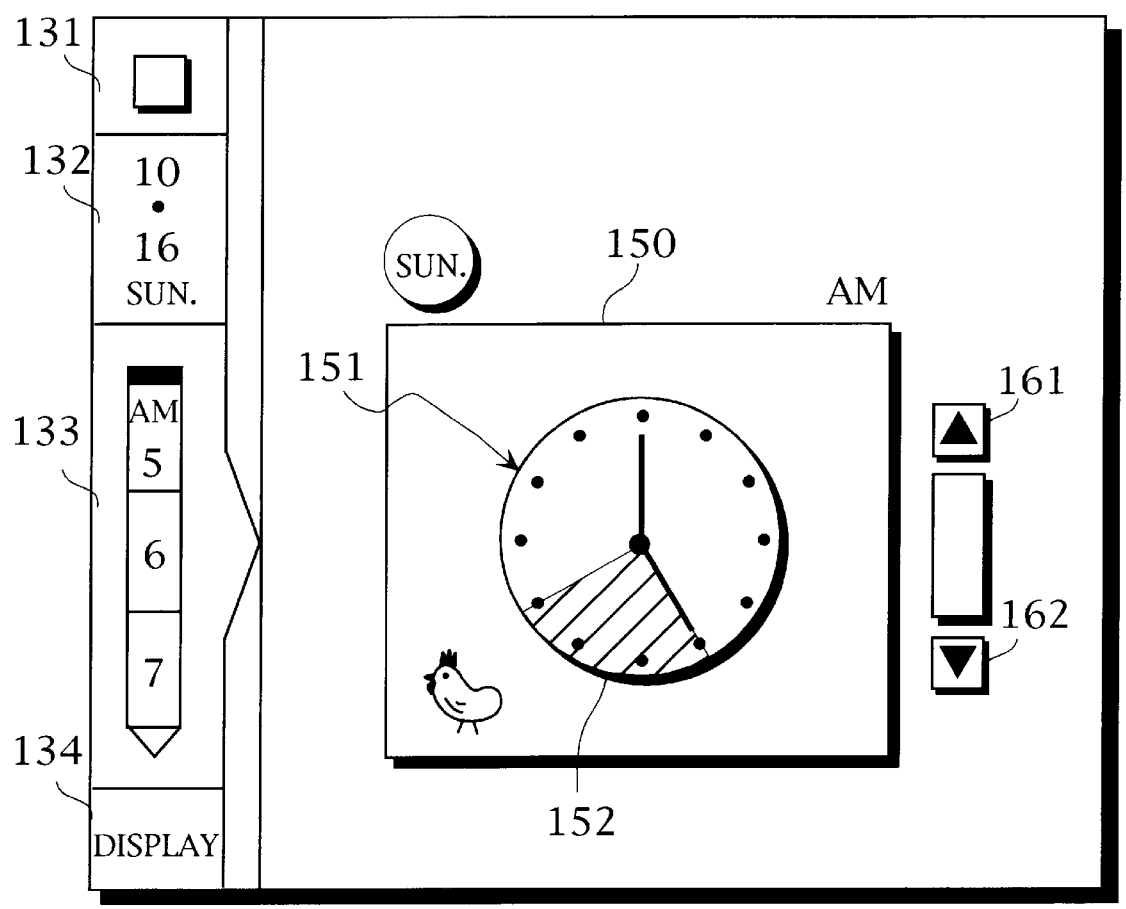
FIG. 9 is a schematic view showing a display time setting screen.
Figure 10:
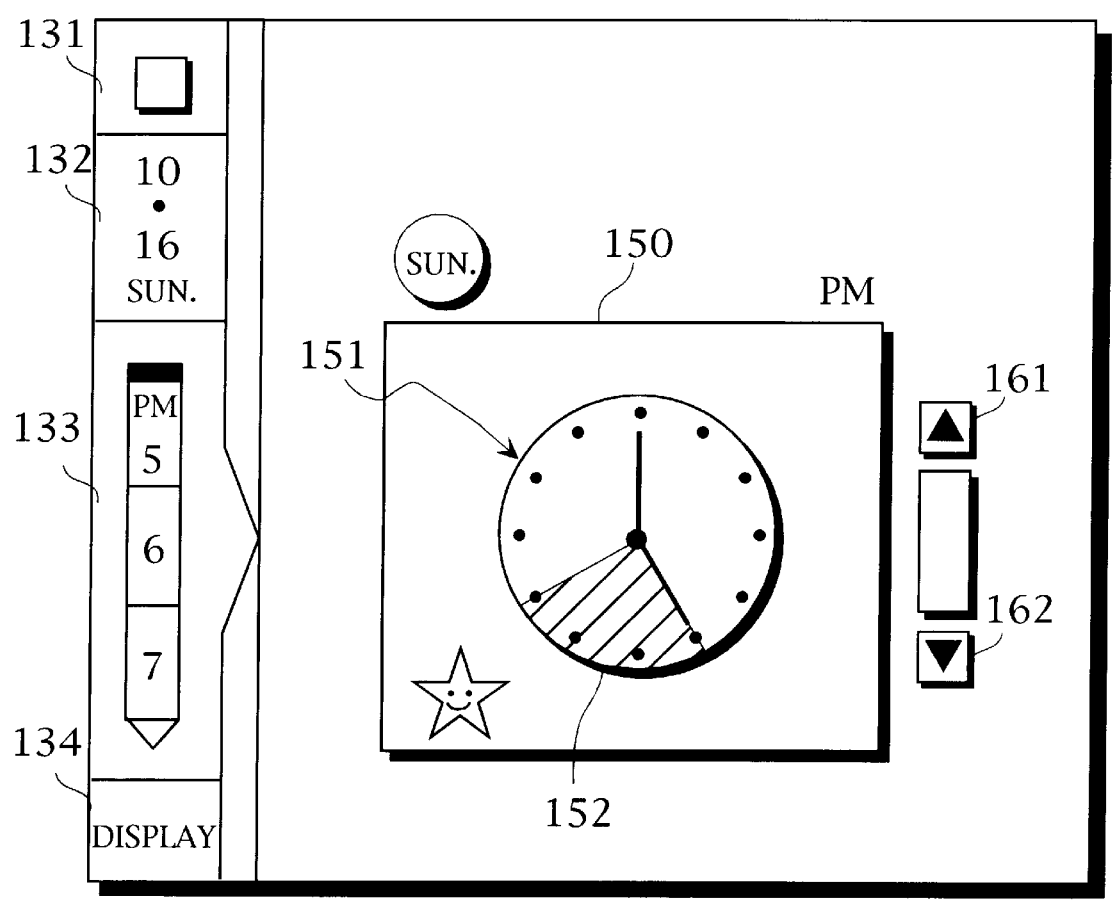
FIG. 10 is a schematic view showing a display time setting screen.

FIGS. 9 and 10 illustrate the display time setting screen.

On the display time setting screen, a clock image 151 representing the time when display is started in the shape of a clock is displayed within a rectangular area 150 at its center, and a time period display portion 152 representing a display time period is displayed in a fan shape and in a color different from a background color.

A day of week corresponding to the display date currently set is displayed above the upper left of the rectangular area 150. Further, information representing morning or afternoon (AM or PM) is displayed above the upper right of the rectangular area 150.

A positive button 161 for advancing the time and a negative button 162 for returning the time are vertically spaced apart from each other on the right side of the rectangular area 150. Every time the cursor key 81 is pressed in a state where the cursor is positioned on the positive button 161, the clock image 151 and the time period display portion 152 are changed in the direction in which the time is advanced. Every time the cursor key 82 is pressed in a state where the cursor is positioned on the negative button 162, the clock image 151 and the time period display portion 152 are changed in the direction in which the time is returned. When the determination key 85 is operated, the display time period currently represented by the time period display portion 152 is set as display time.

A display channel setting button 131, a display date setting button 132, a display time setting button 133, and a program guide screen display button 134 are provided at the left of the display time setting screen. If the display channel setting button 131 is selected by the cursor keys 81 to 84, and the determination key 85 is then operated, the display screen is changed into the display channel setting screen. If the display date setting button 132 is selected by the cursor keys 81 to 84, and the determination key 85 is then operated, the display screen is changed into the display date setting screen.

Time periods corresponding to the clock image 151 and the time period display portion 152 are displayed in the display time setting button 133. Although the display time setting button 133 is generally rectangular, it is displayed on the display time setting screen upon being deformed such that its right end is triangular in order to clearly show that the current screen is the display time setting screen. If the program guide screen display button 134 is selected by the cursor keys 81 to 84, and the determination key 85 is then operated, the channel range, the display date and the display time which are currently set are displayed, and a program guide screen adapted to the channel range, the display date and the display time which are currently set is then displayed.

Figure 11:
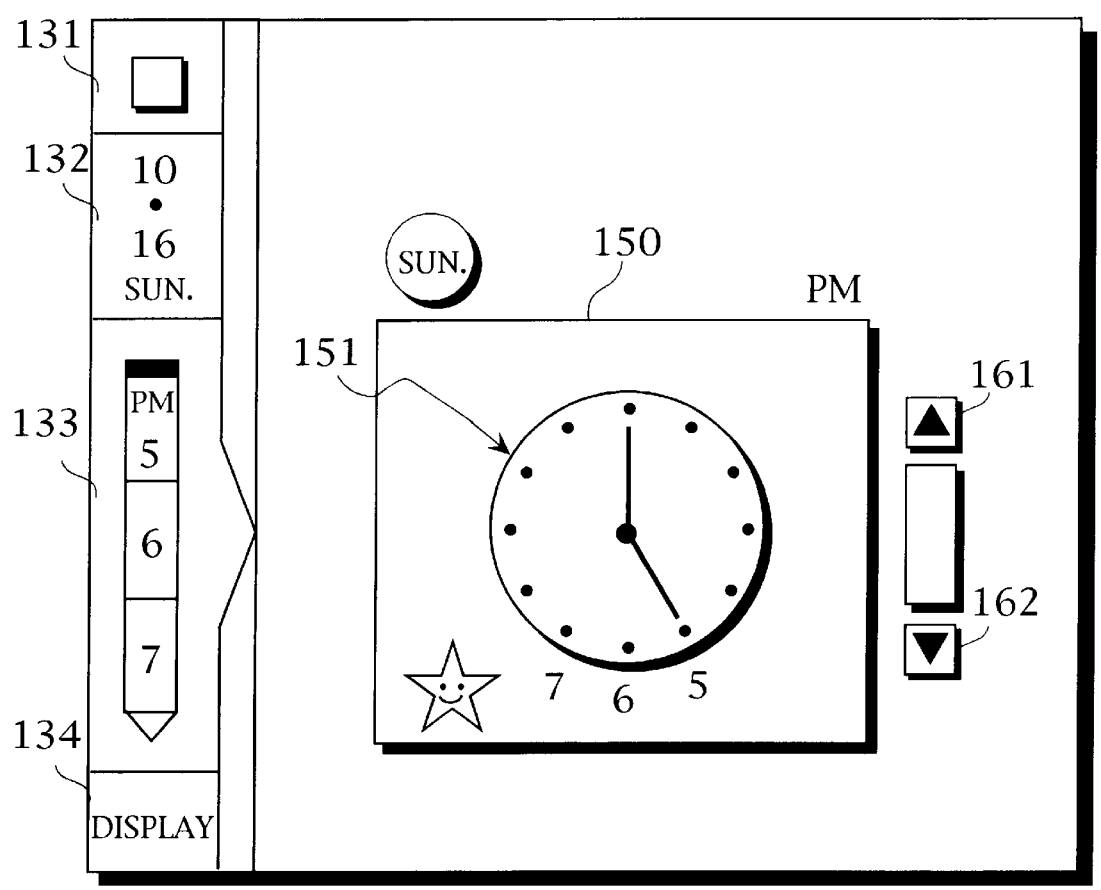
FIG. 11 is a schematic view showing another example of a display time setting screen.
Figure 12:
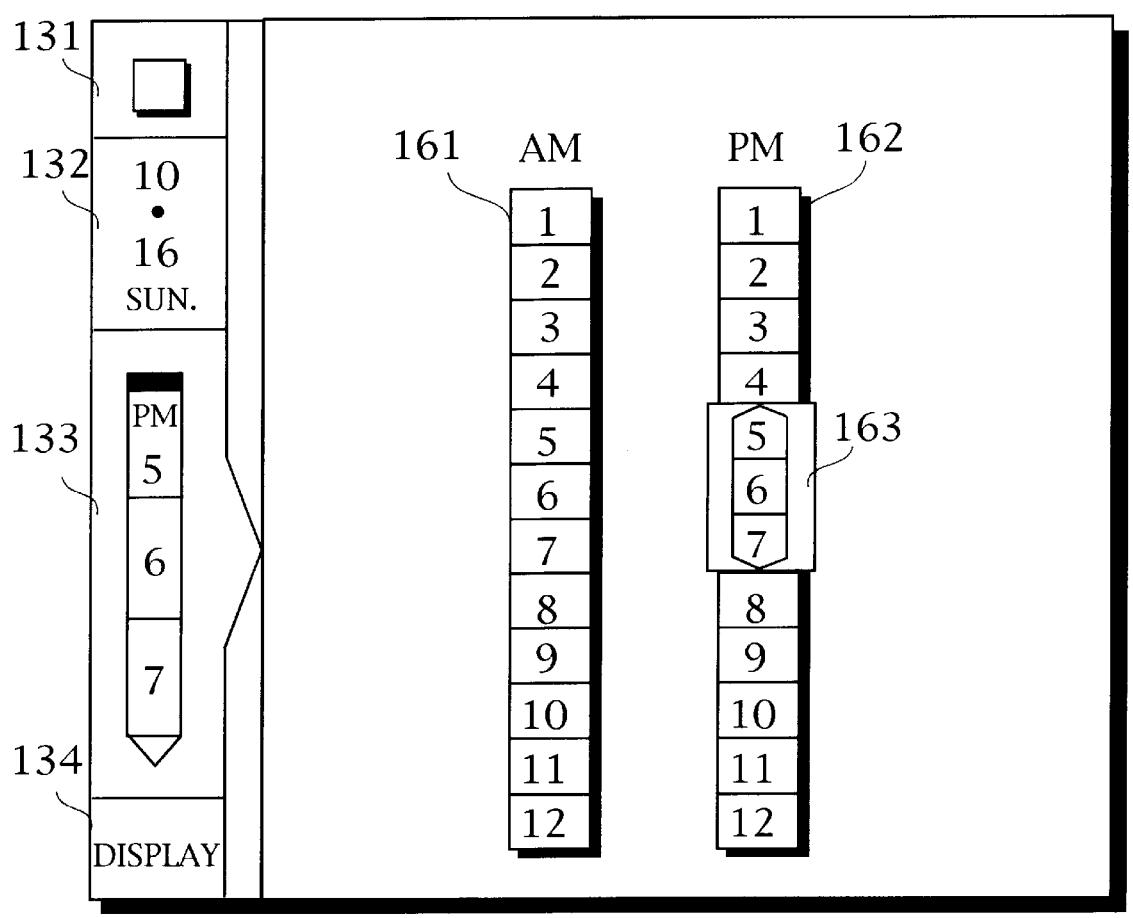
FIG. 12 is a schematic view showing still another example of a display time setting screen.

FIGS. 11 and 12 illustrate modified examples of the display time setting screen.

The example shown in FIG. 11 differs from the example shown in FIG. 9 in the way to display a time period. That is, in the example shown in FIG. 11, the time period is not displayed in a fan shape, and the three times corresponding to three hours representing a display time period are respectively displayed by numerals in colors different from a background color in the clock image 151.

In the example shown in FIG. 12, a band-shaped display portion 161, extending vertically, representing 12 hours in the morning, a band-shaped display portion 162, extending vertically, representing 12 hours in the afternoon, and an index image 163 representing a display time period are displayed. The cursor keys 81 to 84 are operated, to move the index image 163 to a desired display time period, and the determination key 85 is then operated, so that the display time period is set.

[4] Description of User Setting

In the television receiver, the following user setting can be performed with respect to the CS broadcast programs.

(1) Favorite channel Setting: The user sets his or her favorite channel.

(2) Channel Skip Setting: When a selected channel for CS broadcasting is switched by the channel skip keys 61 and 62, a channel range to be switched is set.

(3) Preset Setting: Channels for CS broadcasting are respectively assigned to the BS channel keys 51 to 58.

By the setting in above-mentioned item (1), the following is possible. That is, by designating a favorite channel in the above-mentioned favorite channel setting, a channel range in which program guides are displayed on the program guide screen can be limited to the channel set by the favorite channel setting. By designating the favorite channel, as described later, in the channel skip setting, the channel range to be switched by the channel skip keys 61 and 62 can be limited to the channel set by the favorite channel setting. Further, by designating automatic setting, as described later, in the preset setting, channels set by the favorite channel setting can be respectively automatically assigned to the BS channel keys 51 to 58.

Before describing the user setting, description is made of a table or the like provided in a storage device in the system controller.

Although the index table and the display table for displaying the program guide screen have already been described, a table, relating to the user setting, other than the tables and a flag relating to the user setting will be described.

The storage device is provided with an all-channel table 201, a no-charge and contracted channel table 202, a favorite channel table 203, a preset key table 204, and so forth in addition to the index table and the display table.

Figure 13:
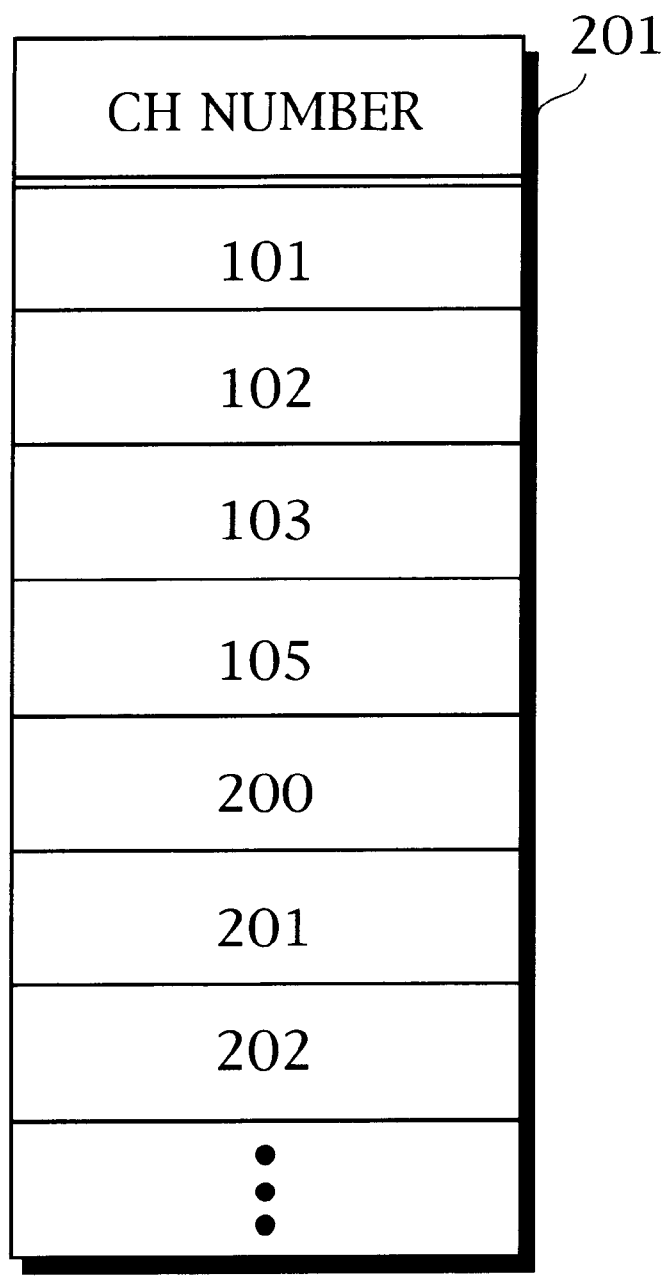
FIG. 13 is a schematic view showing an all-channel table.

Channel numbers for receivable CS broadcasting are stored in ascending order, as shown in FIG. 13, in the all-channel table 201.

Figure 14:
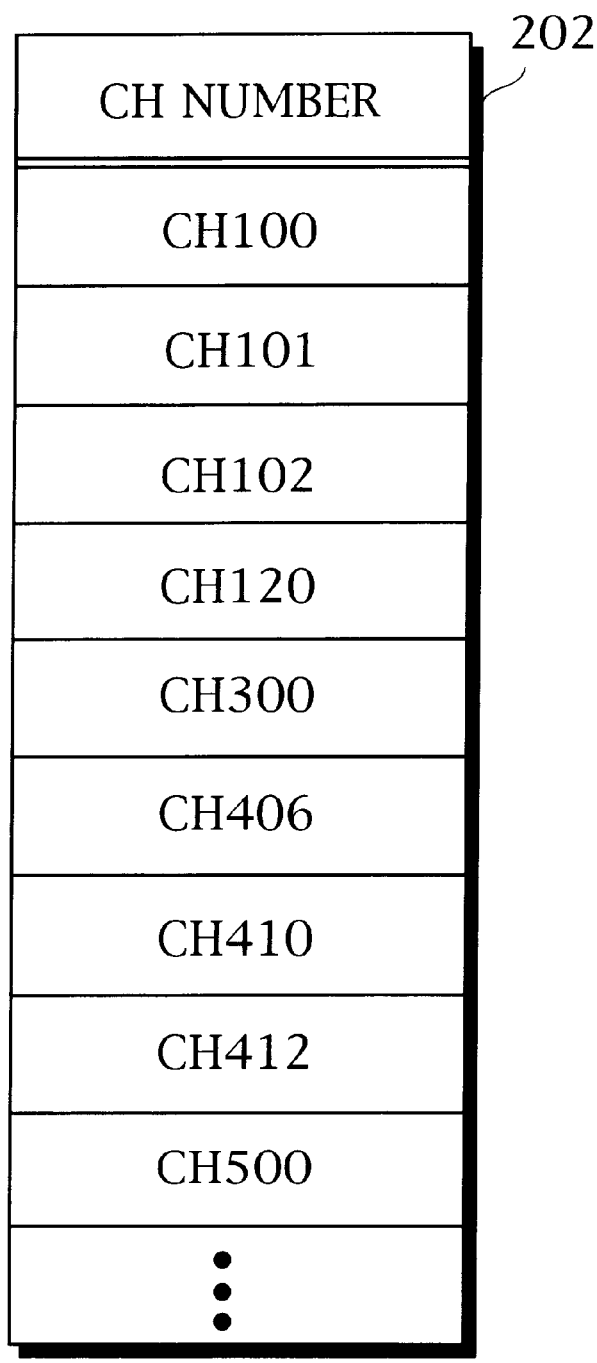
FIG. 14 is a schematic view showing a no-charge and contracted channel table.

Channel numbers of no-charge channels and contracted channels which are contracted by the user out of the channel numbers stored in the all-channel table 201 are stored in ascending order, as shown in FIG. 14, in the no-charge and contracted channel table 202.

Figure 15:
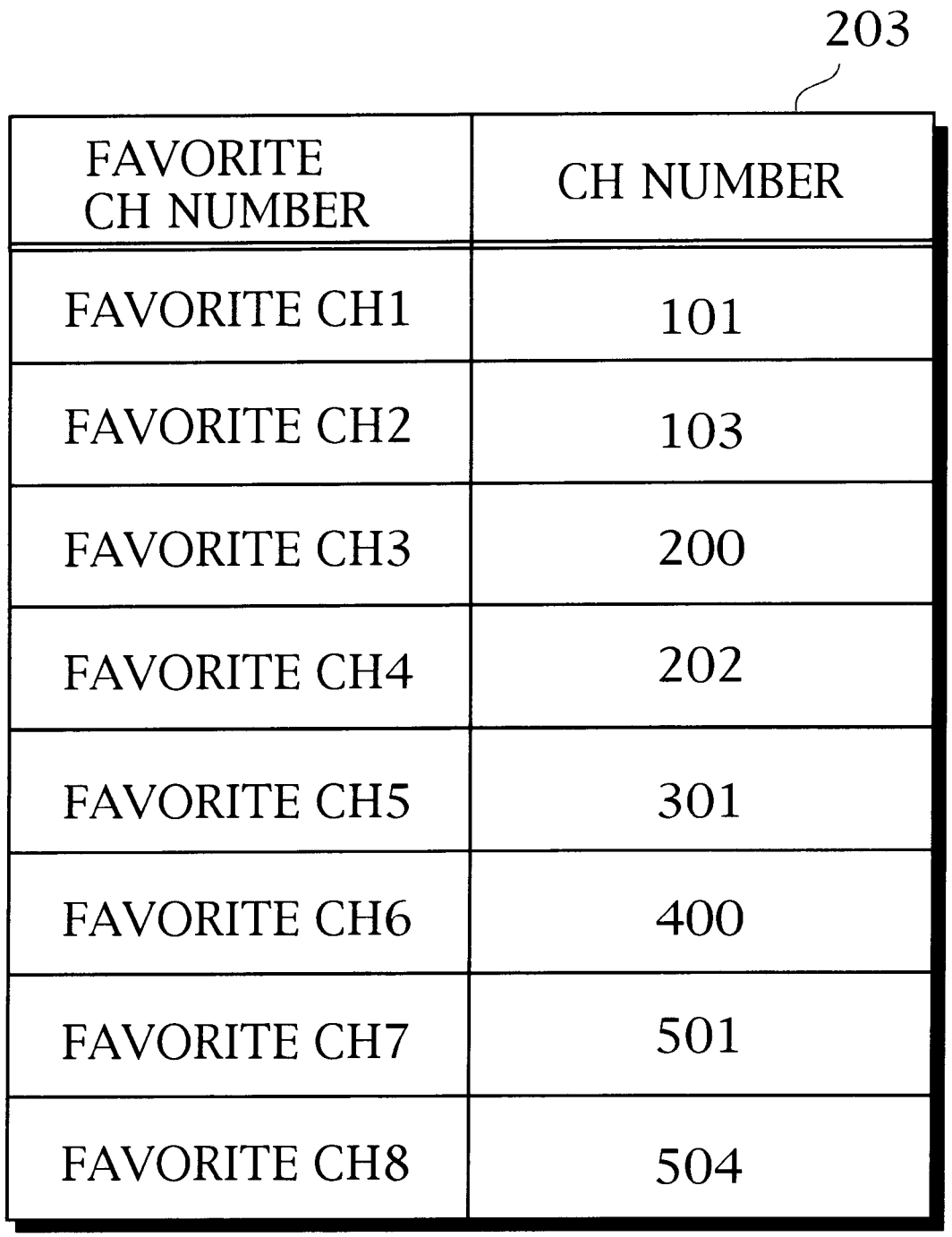
FIG. 15 is a schematic view showing a favorite channel table.

Channel numbers set by the favorite channel setting can be registered with respect to eight favorite channels, as shown in FIG. 15, in this example, in the favorite channel table 203. The channel numbers set by the favorite channel setting are stored in ascending order in the favorite channel table 203.

The channels set by the preset setting are respectively stored for the BS program selection keys 51 to 58, as shown in FIG. 16, in the preset key table 204.

Examples of the flag include a receiving mode flat F1, a skip mode flag F2, a preset effective/ineffective flag D3, and a preset setting mode flag F4.

The receiving mode flag F1 is a flag for storing a receiving mode currently set out of a ground wave broadcast program receiving mode, a BS broadcast program receiving mode, and a CS broadcast program receiving mode.

The skip mode flag F2 is a flag for storing a channel range set by the channel skip setting out of the all-channels, the no-charge and contracted channels, and the favorite channels.

The preset effective/ineffective flag F3 is a flag for storing judgment whether a function by the preset setting is effective (a preset setting effective mode) or ineffective (a preset setting ineffective mode).

The preset setting mode flag F4 is a flag for storing judgment whether an automatic setting mode is selected or a manual setting mode is selected in the preset setting.

[4-1] Description of Favorite Channel Setting

Description is made of an operation performed by the user in a case where the favorite channel setting is performed.

Figure 17:
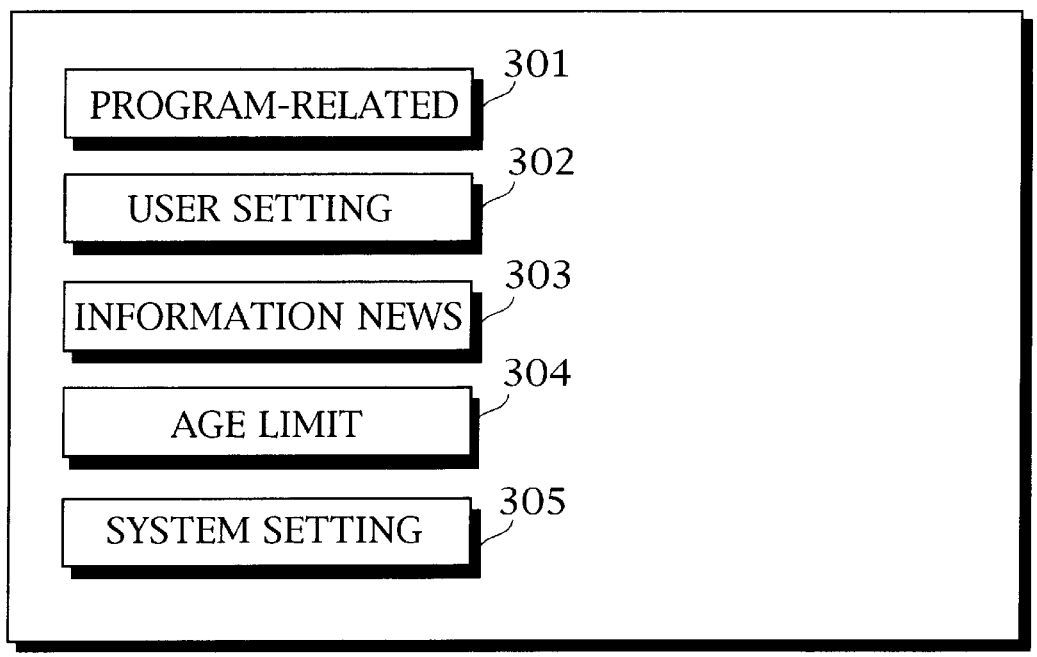
FIG. 17 is a schematic view showing a main menu screen.

The user presses the menu key 73 on the second operation section 32 in the remote control transmitter 9. Consequently, a main menu screen as shown in FIG. 17 is displayed on the CRT 17. Five main selection items 301 to 305 including a main selection item corresponding to the user setting are displayed on the main menu screen.

Figure 18:
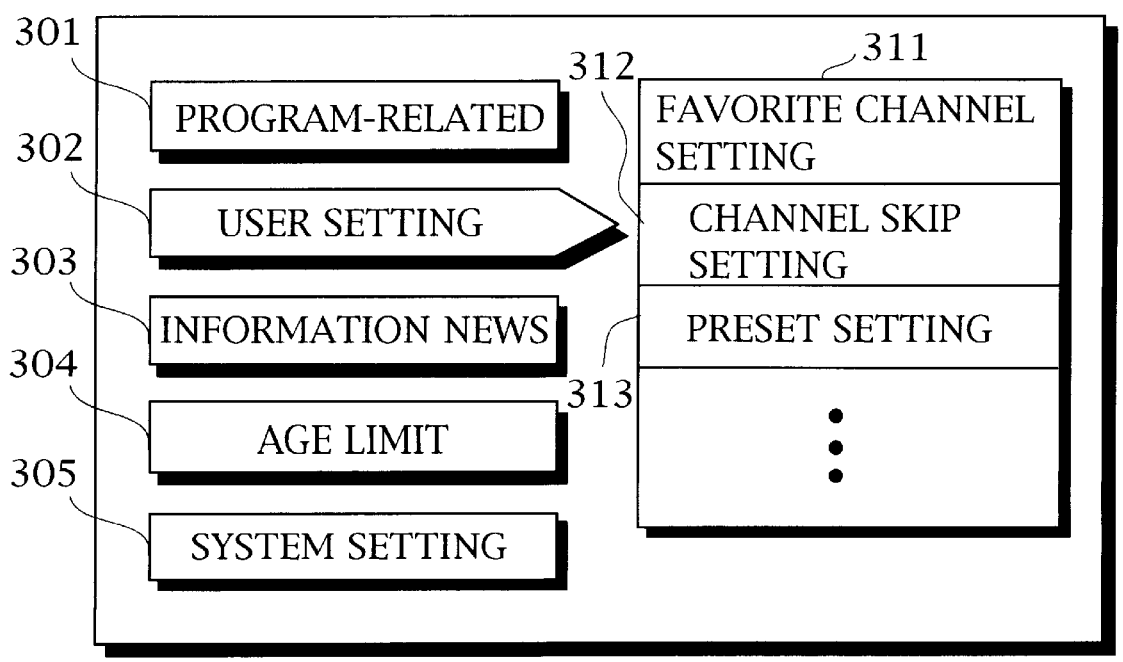
FIG. 18 is a schematic view showing sub-selection items corresponding to user setting.

The user selects the main selection item 302 corresponding to the user setting by the cursor keys 81 to 84, and presses the determination key 85. Consequently, sub-selection items corresponding to the user setting appear, as shown in FIG. 18. Examples of the sub-selection items include a sub-selection item 311 corresponding to favorite channel setting, a sub-selection item 312 corresponding to channel skip setting, and a sub-selection item 313 corresponding to preset setting.

The user then selects the sub-selection item 311 corresponding to the favorite channel setting by the cursor keys 81 to 84, and presses the determination key 85.

Figure 19:
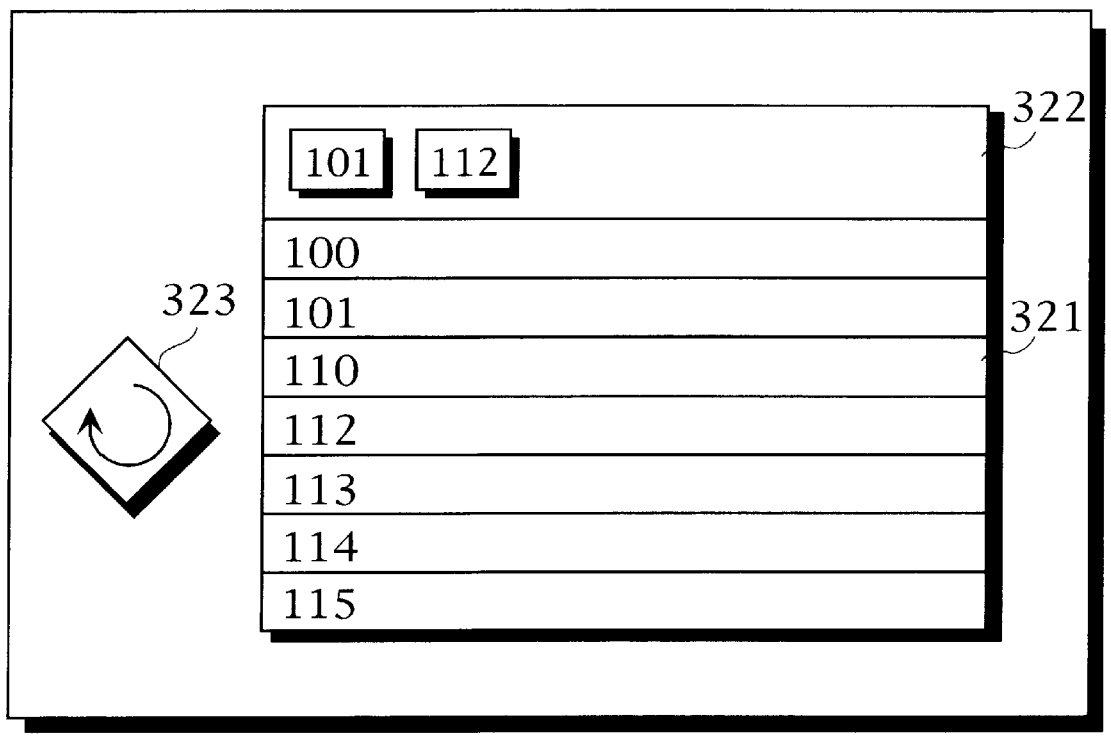
FIG. 19 is a schematic view showing a favorite channel setting screen.

Consequently, a favorite channel setting screen is displayed on the CRT 17, as shown in FIG. 19. A channel number list 321 is displayed on the favorite channel setting screen. A set channel display row 322 for displaying a channel number set by the favorite channel setting is provided at the top of the channel number list 321. A return button 323 for returning the display screen to the main menu screen (FIG. 17) is displayed at the left of the channel setting screen.

The user then selects a channel number to be set as a favorite channel by the cursor keys (the cursor upward-and-downward moving keys) 81 and 82 in the channel number list 321. In this case, a channel number which is not displayed in the screen can be displayed by operating the cursor keys 81 and 82 to scroll the channel number list 321.

When the channel number to be set as a favorite channel is selected by the cursor keys 81 and 82, and the determination key 85 is then pressed, the selected channel number is displayed in the set channel display row 322, and is registered in the favorite channel table 203 (see FIG. 15).

When the channel number which has already been registered is canceled, the determination key 85 may be pressed after the channel number which has already been registered is selected by the cursor keys 81 and 82. When the return button 323 is selected by the cursor keys 81 to 84, and the determination key 85 is then pressed, the display screen is returned to the main menu screen (FIG. 17).

Figure 20:
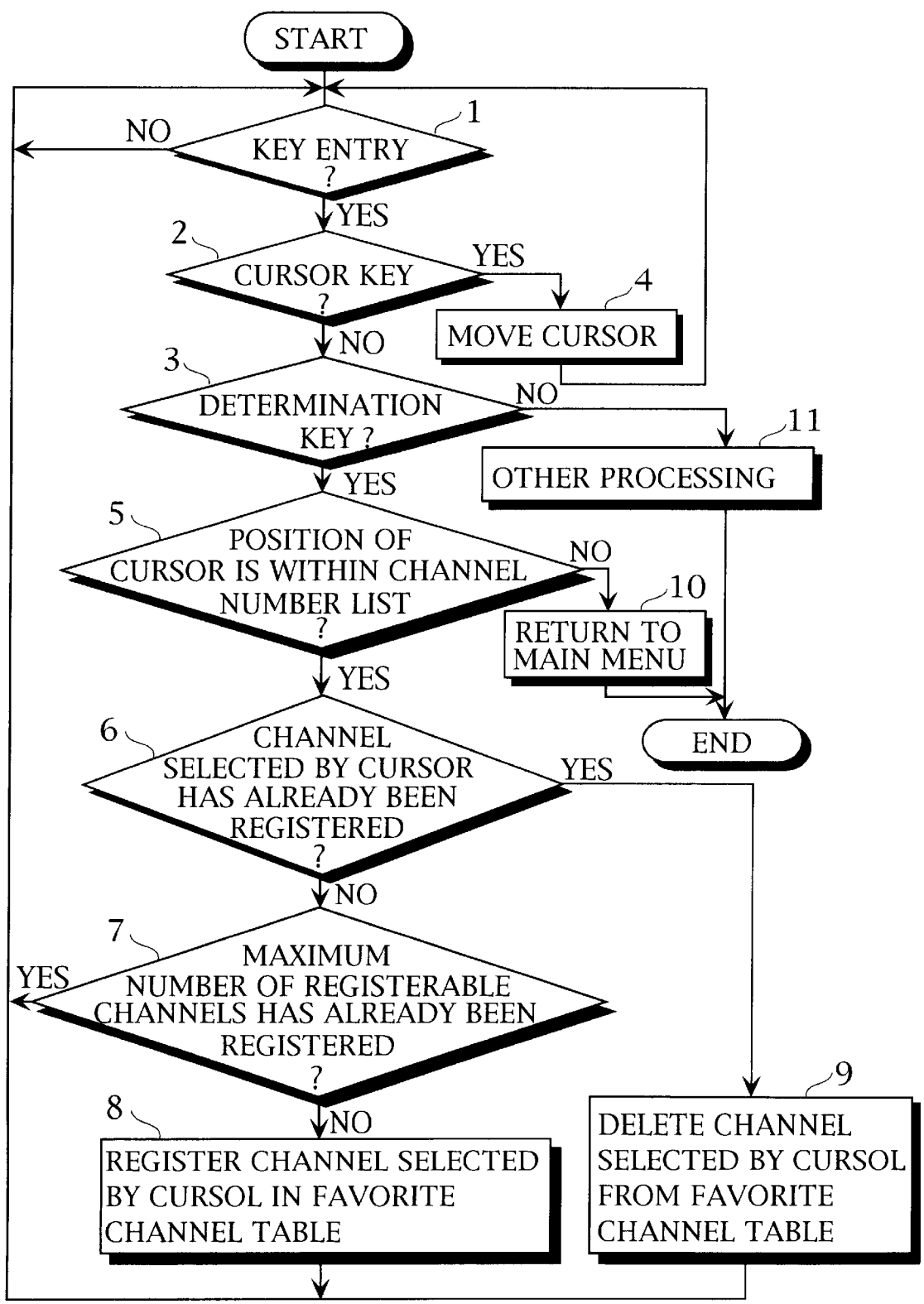
FIG. 20 is a flow chart showing the procedure for processing in a system controller in a case where the favorite channel setting screen shown in FIG. 19 is displayed.

FIG. 20 shows the procedure for processing by the system controller in a case where the channel setting screen shown in FIG. 19 is displayed.

If key entry is provided (YES at step 1), it is judged whether the key entry is key entry by the cursor keys 81 to 84, key entry by the determination key 85, and key entry by the other keys (steps 2 and 3).

If the key entry is the key entry by the cursor keys 81 to 84 (YES at step 2), the cursor is moved in a direction corresponding to the operated cursor key 81 to 84 (step 4). Thereafter, the procedure is returned to the step 1.

When the key entry is the key entry by the determination key 85 (YES at step 3), it is judged whether the position of the cursor is within the channel number list 321 or the return button 323 (step 5).

When the position of the cursor is within the channel number list 321, it is judged whether or not a channel selected by the cursor has already been registered as a favorite channel in the favorite channel table 203 (see FIG. 15) (step 6).

When the channel selected by the cursor has not been registered as the favorite channel, it is judged whether or not the maximum number of registerable channels (eight in this example) has already been registered in the favorite channel table 203 (step 7).

When the maximum number of registerable channels has not been registered in the favorite channel table 203, the channel number currently selected is registered in the favorite channel table 203, and the channel number currently registered is displayed at the top of the channel number list in the channel setting screen (step 8). In this case, data in the favorite channel table 203 are rearranged such that channel numbers registered as favorite channels are arranged in ascending order, and channel numbers displayed at the top of the channel number list in the channel setting screen are also rearranged.

When it is judged at the foregoing step 6 that the channel selected by the cursor has already been registered as a favorite channel, the channel number currently selected is deleted from the favorite channel table 203, and the channel number displayed at the top of the channel number list in the channel setting screen is also deleted (step 9). In this case, the data in the favorite channel table 203 are rearranged such that the channel numbers registered as favorite channels are arranged in ascending order, and the channel numbers displayed at the top of the channel number list in the channel setting screen are also rearranged.

When the maximum number of registerable channels is registered in the favorite channel table 203 at the foregoing step 7, the procedure is returned to the step 1.

When it is judged at the foregoing step 5 that the position of the cursor is within the return button 323, the display screen is returned to the main menu screen (FIG. 17) (step 10).

When the answer is in the negative at the step 3, it is judged that the keys other than the cursor keys 81 to 84 and the determination key 85 are entered. Accordingly, processing corresponding to the key entry is performed (step 11).

[4-2] Description of Channel Skip Setting

Description is made of an operation performed by the user in a case where the channel skip setting is performed.

As shown in FIG. 18, a state where the sub-selection items corresponding to the user setting are displayed will be first described.

Figure 21:
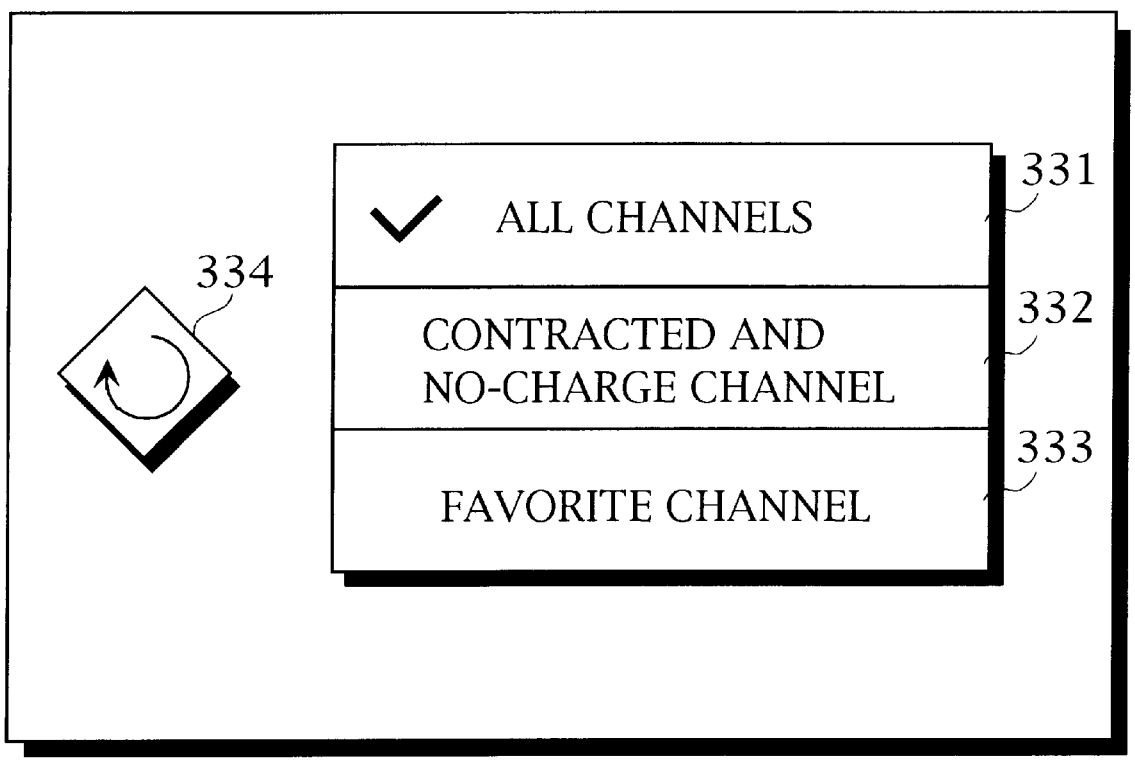
FIG. 21 is a schematic view showing a channel skip setting screen.

The user selects the sub-selection item 312 corresponding to the channel skip setting by the cursor keys 81 to 84, and presses the determination key 85. Consequently, a channel skip setting screen is displayed on the CRT 17, as shown in FIG. 21.

A selection item 331 for selecting all channels, a selection item 332 for selecting contracted and no-charge channels, and a selection item 333 for selecting a favorite channel are displayed as a channel range to be switched by the channel skip keys 61 and 62. In the selection item, corresponding to the channel range, currently set, a mark indicating that the selection item is set is displayed. Further, a return button 334 for returning the display screen to the main menu screen (FIG. 17) is displayed at the left of the channel skip setting screen.

The user selects the selection item to be set as the channel range which is switched by the channel skip keys 61 and 62 using the cursor keys (the cursor upward-and-downward moving keys) 81 and 82 on the channel skip setting screen, and then presses the determination key 85. Consequently, a mark is displayed in the selected selection item, and the value of the skip mode flag F2 is set to a value corresponding to the channel range corresponding to the selected selection item.

When the return button 334 is selected by the cursor keys 81 to 84, and the determination key 85 is then pressed, the display screen is returned to the main menu screen (FIG. 17).

Figure 22:
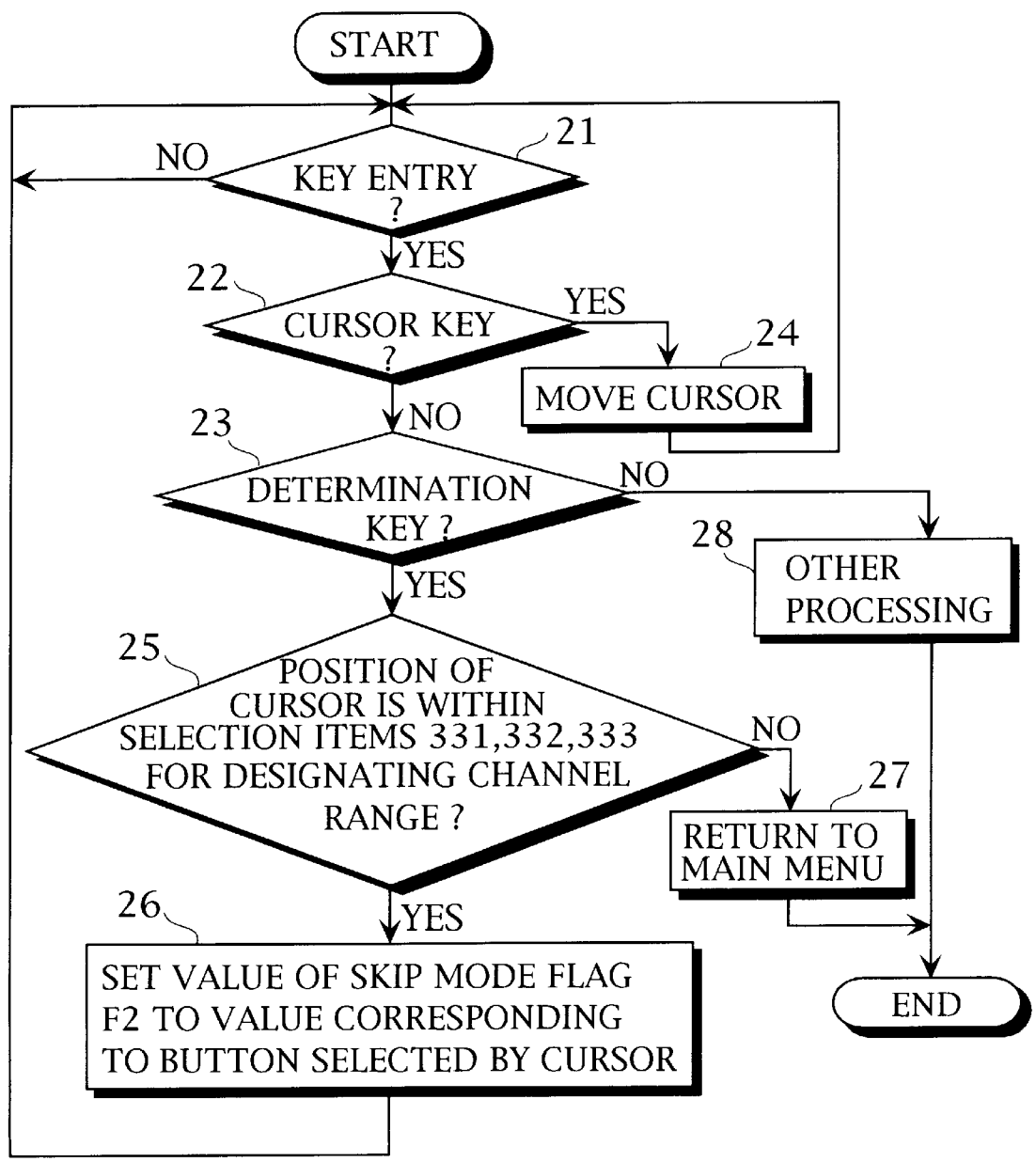
FIG. 22 is a flow chart showing the procedure for processing by a system controller in a case where the channel skip setting screen shown in FIG. 21 is displayed.

FIG. 22 shows the procedure for processing by the system controller in a case where the channel skip setting screen shown in FIG. 21 is displayed.

If key entry is provided (YES at step 21), it is judged whether the key entry is key entry by the cursor keys 81 to 84, key entry by the determination key 85, and key entry by the other keys (steps 22 and 23).

If the key entry is the key entry by the cursor keys 81 to 84 (YES at step 22), the cursor is moved in a direction corresponding to the operated cursor key 81 to 84 (step 24). Thereafter, the procedure is returned to the step 21.

When the key entry is the key entry by the determination key 85 (YES at step 23), it is judged whether the position of the cursor is within the selection items 331, 332, and 333 for designating the channel range or within the return button 334 (step 25).

When the position of the cursor is within the selection items 331, 332, and 333 for designating the channel range, the value of the skip mode flag F2 is set to a value corresponding to the channel range corresponding to the selection item selected by the cursor (step 26). Thereafter, the procedure is returned to the step 21.

When it is judged at the foregoing step 25 that the position of the cursor is within the return button 334, the display screen is returned to the main menu screen (FIG. 17) (step 27).

When the answer is in the negative at the step 23, it is judged that the keys other than the cursor keys 81 to 84 and the determination key 85 are entered. Accordingly, processing corresponding to the key entry is performed (step 28).

Figure 23:
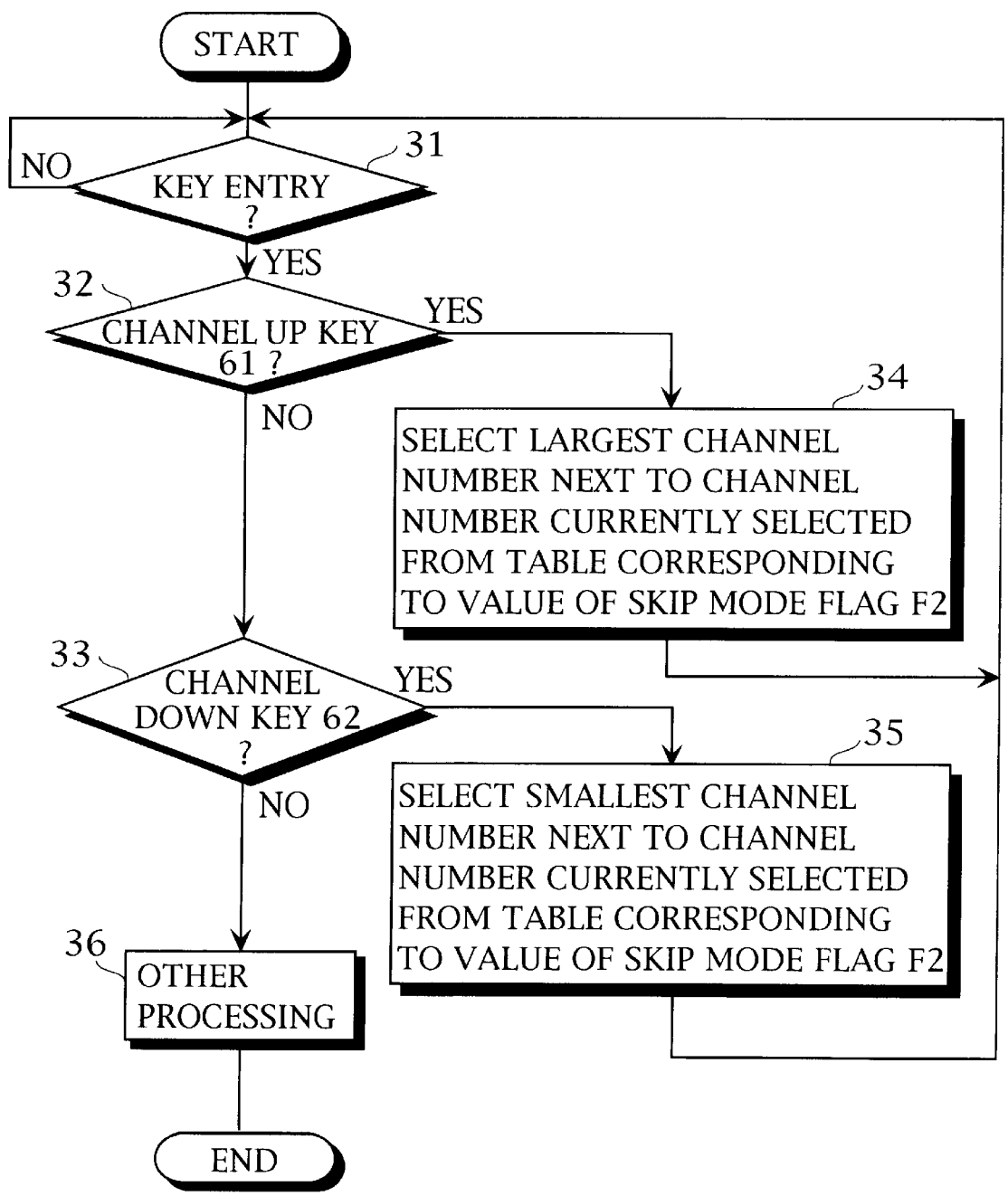
FIG. 23 is a flow chart showing the procedure for processing in a system controller in a case where a channel skip key is operated when the receiving mode is a CS broadcast program receiving mode.

FIG. 23 shows the procedure for processing by the system controller (channel skip processing) in a case where the channel skip keys 61 and 62 are operated when the receiving mode is the CS broadcast program receiving mode.

If key entry is provided (YES at step 31), it is judged whether the key entry is key entry by the channel skip key (channel UP key) 61, key entry by the channel skip key (channel DOWN key) 62, or key entry by the other keys (steps 32 and 33).

If the key entry is the key entry by the channel UP key 61 (YES at step 32), the largest channel number next to the channel number currently selected is selected from the table, corresponding to the value of the skip mode flag F2, out of the all-channel table 201 (FIG. 13), the no-charge and contracted channel table 202 (FIG. 14), and the favorite channel table 203 (FIG. 15) (step 34). Thereafter, the procedure is returned to the step 31. When the channel number currently selected is the largest channel number in the table corresponding to the value of the skip mode flag F2, however, the smallest channel number in the table is selected.

If the key entry is the key entry by the channel DOWN key 62 (YES at step 33), the smallest channel number next to the channel number currently selected is selected from the table, corresponding to the value of the skip mode flag F2, out of the all-channel table 201 (FIG. 13), the no-charge and contracted channel table 202 (FIG. 14), and the favorite channel table 203 (FIG. 15) (step 35). Thereafter, the procedure is returned to the step 31. When the channel number currently selected is the smallest channel number in the table corresponding to the value of the skip mode flag F2, however, the largest channel number in the table is selected.

When the answer is in the negative at the foregoing step 33, it is judged that the keys other than the channel skip keys 61 and 62 are entered. Accordingly, processing corresponding to the key entry is performed (step 36). Thereafter, the current channel skip processing is terminated.

[4-3] Description of Preset Setting

Description is made of an operation performed by the user in a case where the preset setting is performed.

As shown in FIG. 18, a state where the sub-selection items corresponding to the user setting are displayed will be first described.

Figure 24:
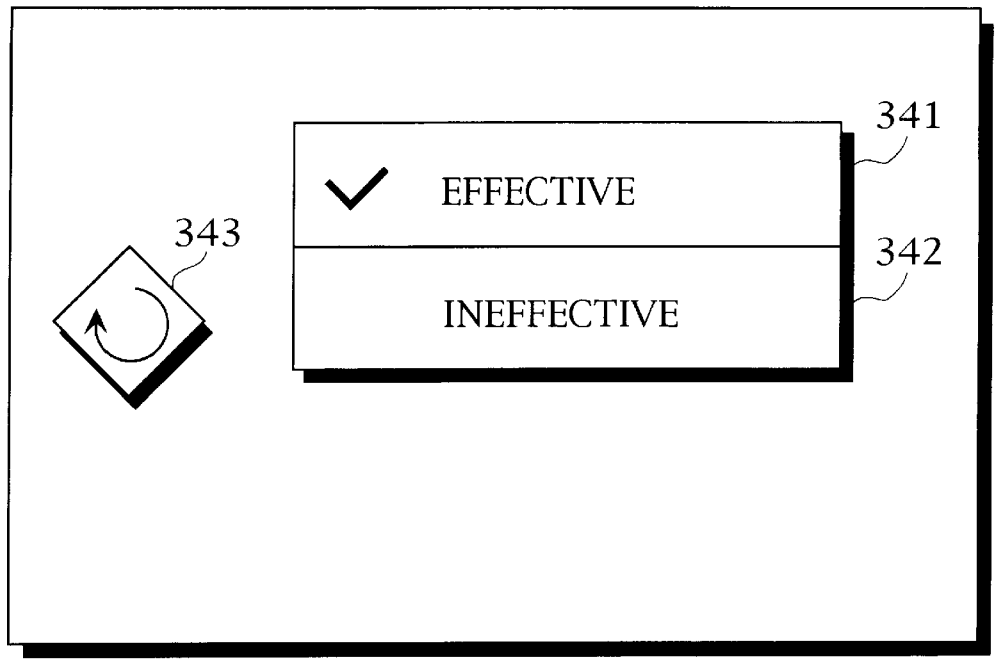
FIG. 24 is a schematic view showing a preset effective/ineffective setting screen.

The user selects the sub-selection item 313 corresponding to the preset setting by the cursor keys 81 to 84, and presses the determination key 85. Consequently, a preset effective/ineffective setting screen is displayed on the CRT 17, as shown in FIG. 24. On the preset effective/ineffective setting screen, a selection item 341 for making the preset setting effective (a preset setting effective mode) and a selection item 342 for making the preset setting ineffective (a preset setting ineffective mode) are displayed. In the selection item corresponding to the preset effective/ineffective mode currently set, a mark indicating that the selection item is set is displayed. Further, a return button 343 for returning the display screen to the main menu screen (FIG. 17) is displayed at the left of the preset effective/ineffective setting screen.

The user selects the selection item 341 or 342 by the cursor keys 81 and 82 on the preset effective/ineffective setting screen, and then presses the determination key 85. Consequently, a mark is displayed in the selected selection item, and a preset effective/ineffective mode corresponding to the selected selection item is set. That is, the value of the preset effective/ineffective flag F3 is set to a value corresponding to the mode designated by the selected selection item (a preset setting effective mode or a preset setting ineffective mode).

When the return button 343 is selected by the cursor keys 81 to 84, and the determination key 85 is then pressed, the display screen is returned to the main menu screen (FIG. 17).

Figure 25:
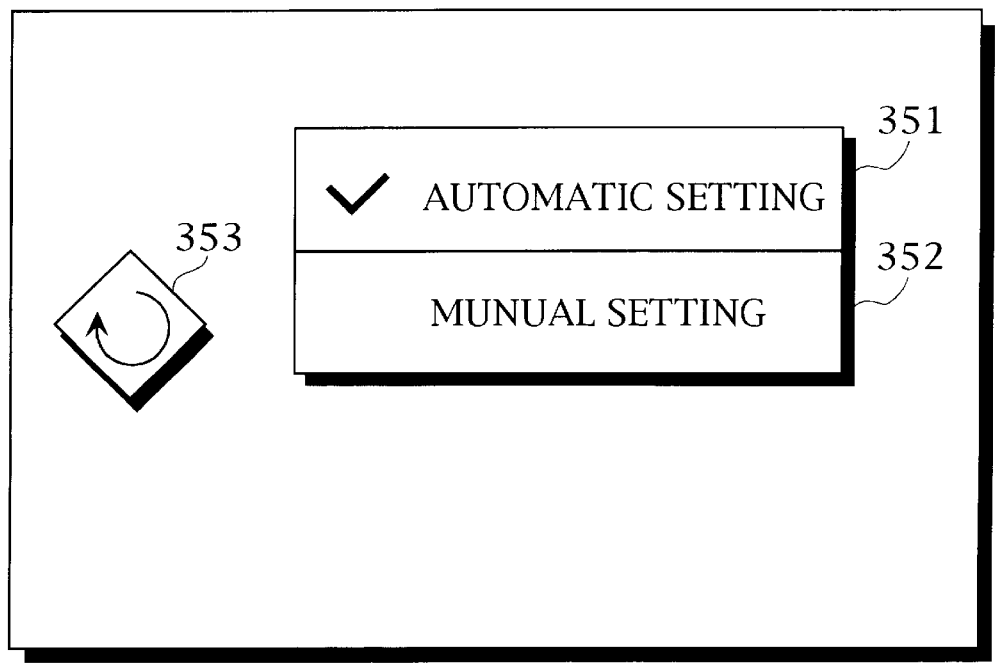
FIG. 25 is a schematic view showing a preset setting mode selecting screen.

When the selection item 342 is selected, and the determination key 85 is then pressed, the preset effective/ineffective mode is changed into the preset ineffective mode. When the selection item 341 is selected, and the determination key 85 is then pressed, the preset effective/ineffective mode is changed into the preset effective mode. As shown in FIG. 25, a preset setting mode selecting screen is displayed on the CRT 17.

On the preset setting mode selecting screen, a selection item 351 for designating an automatic setting mode and a selection item 352 for designating a manual setting mode are displayed. In the selection item corresponding to the preset setting mode currently set, a mark indicating that the selection item is set is displayed. Further, a return button 353 for returning the display screen to the main menu screen (FIG. 17) is displayed at the left of the preset setting mode selecting screen.

The user selects the selection item 351 or 352 by the cursor keys 81 and 82 on the preset setting mode selecting screen, and then presses the determination key 85. Consequently, a mark is displayed in the selected selection item, and a preset setting mode corresponding to the selected selection item is set. That is, the value of the preset setting mode flag F4 is set to a value corresponding to the preset setting mode designated by the selected selection item.

When the return button 353 is selected by the cursor keys 81 to 84, and the determination key 85 is then operated, the display screen is returned to the main menu screen (FIG. 17).

When the selection item 351 is selected, and the determination key 85 is then pressed, the value of the preset setting mode flag F4 is set to a value representing the automatic setting mode, and the contents of the favorite setting table 203 (FIG. 15) are stored in the preset key table 204 (FIG. 16). That is, channel numbers respectively corresponding to the favorite channels ch1 to ch8 are stored as channel numbers assigned to the BS channels (odd channels from ch1 to ch15).

Figure 26:
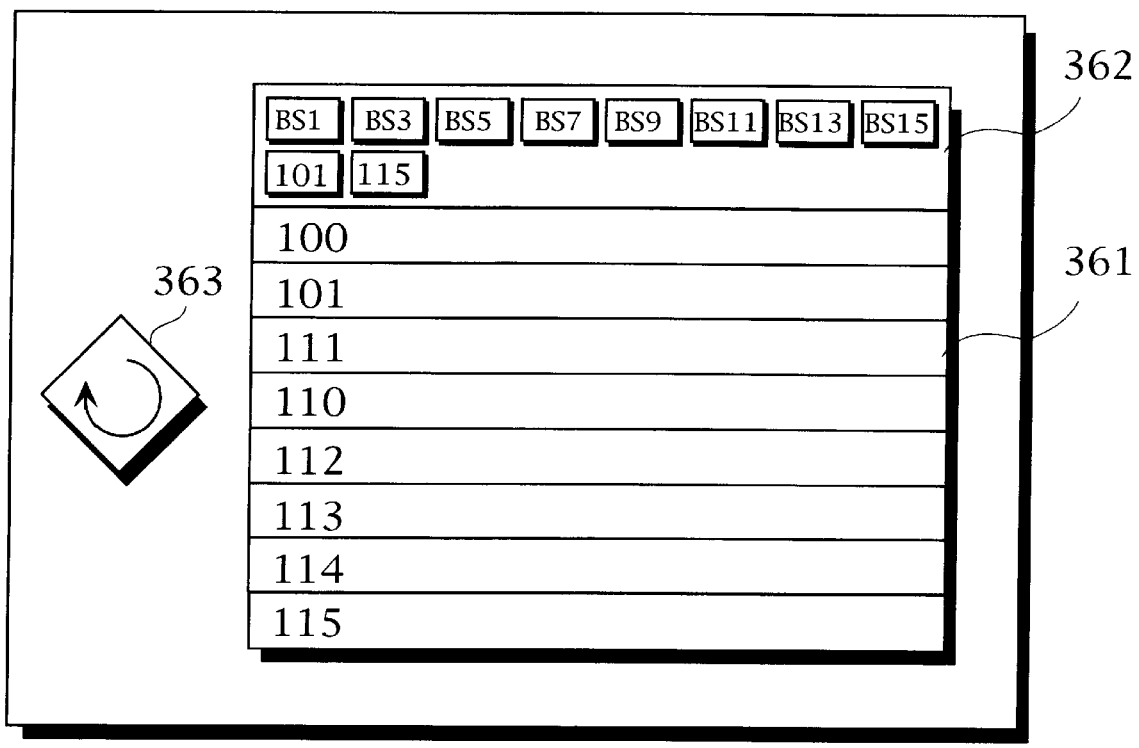
FIG. 26 is a schematic view showing a preset manual setting screen.

When the selection item 352 is selected, and the determination key 85 is then operated, the value of the preset setting mode flag F4 is set to a value representing the manual setting mode. Therefore, a preset manual setting screen is displayed, as shown in FIG. 26.

On the preset manual setting screen, a channel number list 361 for CS broadcasting is displayed. Further, a set channel display row 362 for displaying for each of the BS channels a channel number set by the preset manual setting is provided at the top of the channel number list 361.

BS channel display portions in which the respective BS channels are displayed are provided side by side in the lateral direction in the upper stage of the set channel display row 362, and CS channel display portions for respectively displaying, below the BS channel display portions, channel numbers for CS broadcasting corresponding to the BS channels are provided. Further, a return button 363 for returning the display screen to the main menu screen (FIG. 17) is displayed at the left of the preset manual setting screen. The cursor is first positioned on the BS channel display portion in which BS1 is displayed.

On the preset manual setting screen, the user moves the cursor onto a BS channel (preset destination BS channel) display portion to be assigned a channel for CS broadcasting by the cursor keys (the cursor right-and-left moving keys) 83 and 84, and then presses the determination key 85. Consequently, a CS channel display portion below the selected preset destination BS channel display portion is blank, so that the cursor is automatically moved to the channel number list 361.

The user then selects a channel number for CS broadcasting to be preset by the cursor keys (the cursor upward-and-downward moving keys) 81 and 82. In the case, a channel number which is not displayed in the screen can be also displayed by operating the cursor keys 81 and 82 to scroll the channel number list 361.

When a channel number to be preset is selected, and the determination key 85 is then pressed, the selected channel number is displayed on the CS channel display portion below the preset destination BS channel display portion previously selected, and the selected channel number is stored in the preset key table 204 in correspondence with the preset destination BS channel display portion (FIG. 16).

When the return button 363 is selected by the cursor keys (cursor right-and-left moving keys) 83 and 84, and the determination key 85 is then pressed, the display screen is returned to the main menu screen (FIG. 17).

Figure 27:
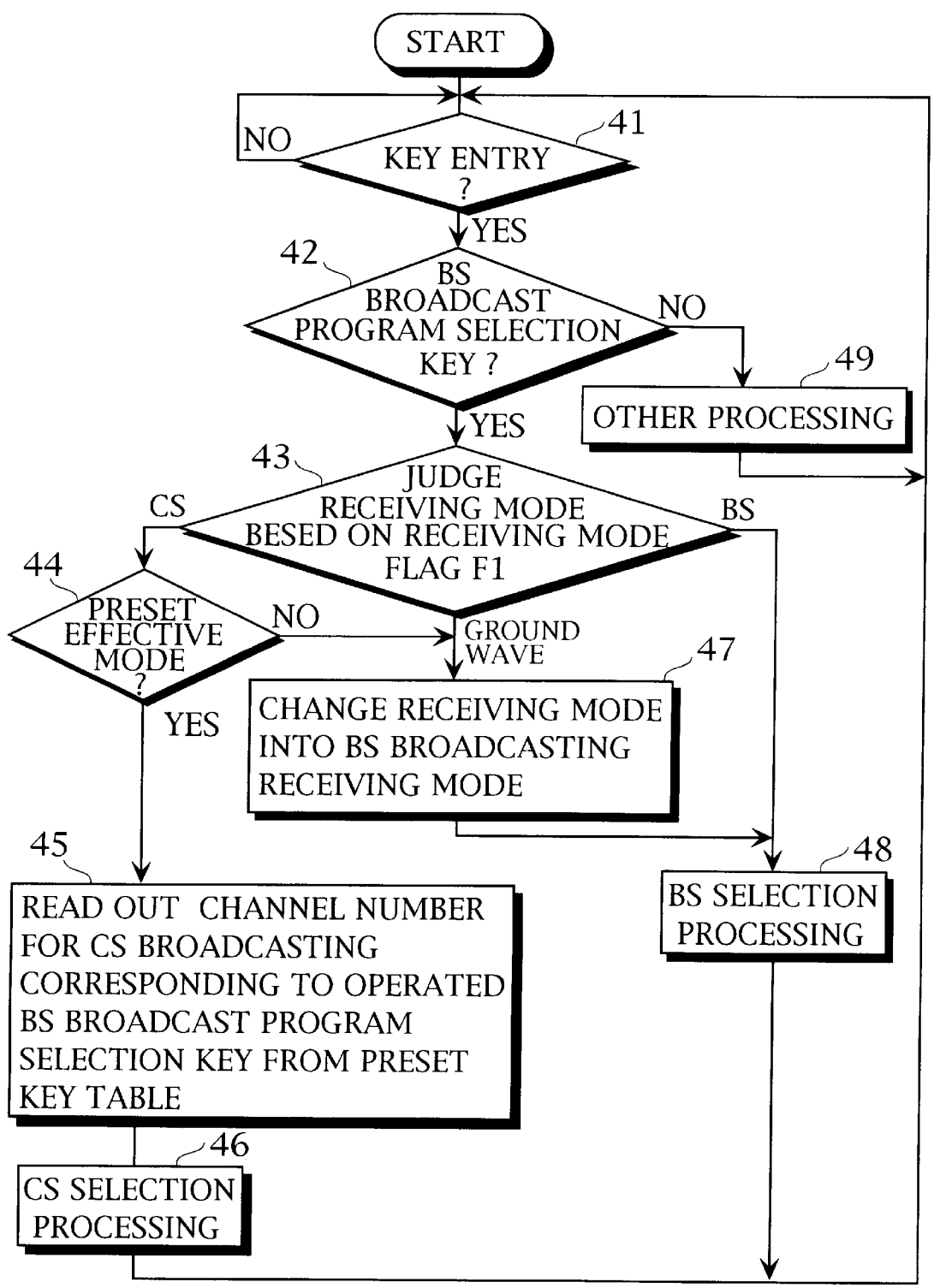
FIG. 27 is a flow chart showing the procedure for processing in a system controller in a case where a BS broadcast program selection key is operated.

FIG. 27 shows the procedure for processing by the system controller in a case where BS broadcast program selection keys are operated.

If key entry is provided (YES at step 41), it is judged whether the key entry is key entry by the BS broadcast program selection keys 51 to 58 or key entry by the other keys (step 42).

If the key entry is the key entry by the BS broadcast program selection keys 51 to 58 (YES at step 42), the receiving mode is judged on the basis of the contents of the receiving mode flag F1 (step 43).

When the receiving mode is the CS broadcast program receiving mode, it is judged whether or not the preset effective mode is set on the basis of the contents of the preset effective/ineffective flag F3 (step 44).

When the preset effective mode is set, a channel number for CS broadcasting corresponding to the operated BS broadcast program selection key is read out from the preset key table 204 (FIG. 16) (step 45). A program corresponding to the channel number read out is selected out of the CS broadcast programs (step 46). Thereafter, the procedure is returned to the step 41.

When it is judged at the foregoing step 44 that the preset effective mode is not set, the receiving mode is changed into the BS broadcast program receiving mode (step 47). A BS broadcast program corresponding to the operated BS broadcast program selection key is selected (step 48). Thereafter, the procedure is returned to the step 41.

When it is judged at the foregoing step 43 that the receiving mode is the ground wave broadcast program receiving mode, the receiving mode is changed into the BS broadcast program receiving mode (step 47). A BS broadcast program corresponding to the operated BS broadcast program selection key is selected (step 48). Thereafter, the procedure is returned to the step 41.

When it is judged at the foregoing step 43 that the receiving mode is the BS broadcast program receiving mode, the BS broadcast program corresponding to the operated BS broadcast program selection key is selected (step 48). Thereafter, the procedure is returned to the step 41.

When the answer is in the negative at the foregoing step 42, it is judged that a key other than the BS broadcast program selection key is operated. Accordingly, processing corresponding to the operated key is performed (step 49).

<INDUSTRIAL APPLICABILITY>

The present invention is suitable for a television receiver capable of receiving at least digital satellite broadcasting such as CS broadcasting.

What is claimed is:

1. A television receiver comprising display means for displaying a plurality of program guides in a matrix shape on a display device utilizing one of the horizontal axis and the vertical axis as a channel number axis and utilizing the other axis as a time axis, and setting means for causing a user to set an air time range in which the program guides are to be displayed on the display device, the setting means comprising means for displaying air times corresponding to hours which can be taken along the time axis in an analog manner on the display device, means for causing the user to change the air times displayed in an analog manner on the display device, and means for causing the user to set the air times displayed in an analog manner on the display device as the air time range in which the program guides are to be displayed.

2. The television receiver according to claim 1, wherein the display means comprises means for displaying a part of a program guide list in a predetermined range as the program guides on the display device, and means for scrolling the program guides along the channel number axis and along the time axis in the program guide list in the predetermined range on the basis of a given input signal.

3. The television receiver according to claim 1, wherein the air time range set by the setting means comprises a clock image representing the start time of the air time range and an image for representing the air time range in relation to the clock image.

4. The television receiver according to claim 2, wherein the air time range set by the setting means comprises a clock image representing the start time of the air time range and an image for representing the air time range in relation to the clock image.

5. The television receiver according to claim 1, wherein the air time range set by the setting means comprises a time series image representing the air times in the shape of a bar graph and an index image representing an arbitrary part of the air time range on the time series image.

6. The television receiver according to claim 2, wherein the air time range set by the setting means comprises a time series image representing the air times in the shape of a bar graph and an index image representing an arbitrary part of the air time range on the time series image.

* * * * *